United States Patent [19]

Maynard et al.

[11] Patent Number: 5,269,739
[45] Date of Patent: Dec. 14, 1993

[54] TOOL CHANGING APPARATUS FOR A TURRET PUNCH PRESS

[75] Inventors: Scott D. Maynard, Newport Beach; Yutaka Takahashi, Placentia, both of Calif.

[73] Assignee: Amada Engineering & Service Co., Inc., La Mirada, Calif.

[21] Appl. No.: 35,201

[22] Filed: Mar. 22, 1993

Related U.S. Application Data

[62] Division of Ser. No. 711,305, Jun. 6, 1991, Pat. No. 5,215,513.

[51] Int. Cl.⁵ ............................................. B23Q 3/155
[52] U.S. Cl. ........................................ 483/29; 72/442; 83/549; 211/1.51; 483/61
[58] Field of Search ................... 483/28, 29, 58, 60, 483/61; 74/446, 448, 462, 442; 83/552, 559, 563, 549; 211/1.51, 1.56, 1.57

[56] References Cited

U.S. PATENT DOCUMENTS

| | | | |
|---|---|---|---|
| 3,628,231 | 12/1971 | Pancook | 483/28 X |
| 4,165,669 | 8/1979 | Brown et al. | 83/552 |
| 4,624,044 | 11/1986 | Bredow et al. | 72/446 X |
| 4,779,329 | 10/1988 | Nordquist et al. | 483/29 |

FOREIGN PATENT DOCUMENTS

| | | | |
|---|---|---|---|
| 0455164 | 11/1991 | European Pat. Off. | |
| 274832 | 12/1986 | Japan | 483/61 |
| 161233 | 7/1991 | Japan | 483/61 |

Primary Examiner—William Briggs
Attorney, Agent, or Firm—Wigman, Cohen, Leitner & Myers

[57] ABSTRACT

A tool changing apparatus for changing the punches and dies on a turret punch press is disclosed, wherein a carriage device provided with a upper rotatable disk on which a plurality of punches in removably supported, and a lower rotatable disk on which a die holders supporting a plurality of dies is removably supported, is positioned at the side of the turret punch press. A punch mounting/dismounting device is further provided for dismounting a punch from and mounting a punch on the upper rotatable disk and for dismounting a punch from and mounting a punch on an upper turret disk on the turret punch press. The punch mounting/dismounting device is adapted to transport the punch between the upper rotatable disk and the upper turret disk. A die mounting/dismounting device is yet further provided for moving the die holder back and forth between a lower turret disk on the turret punch press, and the lower rotatable disk. The die mounting/dismounting device dismounts a die from and mounts a die on the die holder which has been moved onto the rotatable disk. As a result of the above configuration, the tool changing apparatus is capable to automatically change punches and dies on the turret punch press.

3 Claims, 21 Drawing Sheets

TOOL CHANGING APPARATUS FOR A TURRET PUNCH PRESS

This is a divisional of co-pending application Ser. No. 07/711,305 filed on Jun. 6, 1991 U.S. Pat. No. 5,215,513.

BACKGROUND OF THE INVENTION

1. Field of the Invention

The present invention relates to a tool changing apparatus for changing a punch and die each mounted on a upper and lower turret disk of a turret punch press, and, in particular, to a tool changing apparatus which prepares in advance a plurality of punches and dies to be changed to meet the requirements of a subsequent process.

2. Description of the Prior Art

A turret punch press includes upper and lower turret disks each rotatably mounted on a frame of the punch press in opposition to the other disk; a large number of removable punches and dies are mounted on the upper and lower turrets respectively. The turret punch press of this configuration performs a punching operation on a plate workpiece by means of the large number of punches and dies on the upper and lower turret disks, and is capable of performing punching operations of a wide variety of shapes at good efficiency.

However, in recent years, punching operations of more wide variety of shapes are required to performed, and punches and dies of more wide variety of shapes are required than are mounted on the upper and lower turret disks. Hence, there is a requirement for a tool changing apparatus for automatically changing the punches and dies on the turret disks.

Apparatuses for changing the punches and dies on the turret disks have been disclosed, for example, in U.S. Pat. Nos. 4,165,669 and 4,624,044. In the configurations of the tool changing apparatus given above, however, from the structures by which the punch holder and die holders are changed on the turret disks extensive modifications are required in the turret disks or in the punches and dies themselves.

SUMMARY OF THE INVENTION

An object of the present invention is to provide, with due consideration to the drawbacks of such conventional apparatuses, a tool changing apparatus which can automatically changes punches and dies on a turret punch press without substantial modifications in the turret disks or in the punches and dies.

This object is achieved in the present invention by the provision of a tool changing apparatus comprising a tool storage device for storing a plurality of punches and dies; a carriage device for moving back and forth between the tool storage device and the turret punch press; a rotatable disk supported on the carriage device, for supporting dies removed from the turret punch press and removed from the tool storage device; a die holder removably mounted on the lower turret disk; a die holder transfer device for moving the die holder from the lower turret disk onto the rotatable disk, and returning the die holder back to the lower turret disk; a die mounting/dismounting device for changing a die on the die holder which has been moved onto the rotatable disk; and a plurality of punch support arms supported on the carriage device, for holding punches removed from the tool storage device and removed from the turret punch press, each of the punch support arms being extendable and retractable for delivering the punch to and picking up the punch out from the upper turret disk.

In the above configuration, while the turret punch press is performing a punching operation on a plate workpiece, the carriage device moves to the tool storage device, picks up a plurality of punches and dies to be used in the next operation from the tool storage device, and sets and supports the punches and dies preliminarily on the punch support arms and rotatable disk respectively. At the last stage of the above steps, at least one punch support arm and one part of the rotatable disk must be empty, since they have to accept a punch and die to be changed from the turret punch press.

When the turret punch press completes the current processing and a punch and die must be changed, the carriage device moves to a position beside the turret punch press, and a punch is picked up from the turret punch press and is held in one of the punch support arms. Then, a punch which is being held preliminarily in another punch support arm is mounted in its place on the upper turret disk. Also, the die which has been picked up from the turret punch press is placed in an empty position on the rotatable disk, and a die which is being held preliminarily in another position on the rotatable disk is installed in its place on the lower turret disk.

When the punch and die on the upper and lower turret disks have been changed, the carriage device returns to the position beside the tool storage device, and the processing of the next workpiece by the turret punch press commences. During the punching operation on the next workpiece, the punch and die required for the following process are made ready for changing and put on standby at the carriage device.

In the tool changing apparatus of the present invention, the punch is changed by being picked up from the upper turret disk, and the die is changed by being picked up from the die holder withdrawn from the lower turret disk, so that the punches and dies can be changed without a major modification of the upper and lower turret disks or the punches and the dies. In addition, because the punches and dies to be used in the next process can be prepared in advance, major improvements in efficiency are realized.

BRIEF DESCRIPTION OF THE DRAWINGS

These and other objects, features, and advantages of the present invention will become more apparent from the following description of the preferred taken in conjunction with the accompanying drawings, in which.

DETAILED DESCRIPTION OF THE PREFERRED EMBODIMENTS

Other features of this invention will become apparent in the course of the following description of exemplary embodiments which are given for illustration of the invention and are not intended to be limiting thereof.

Figure 1:
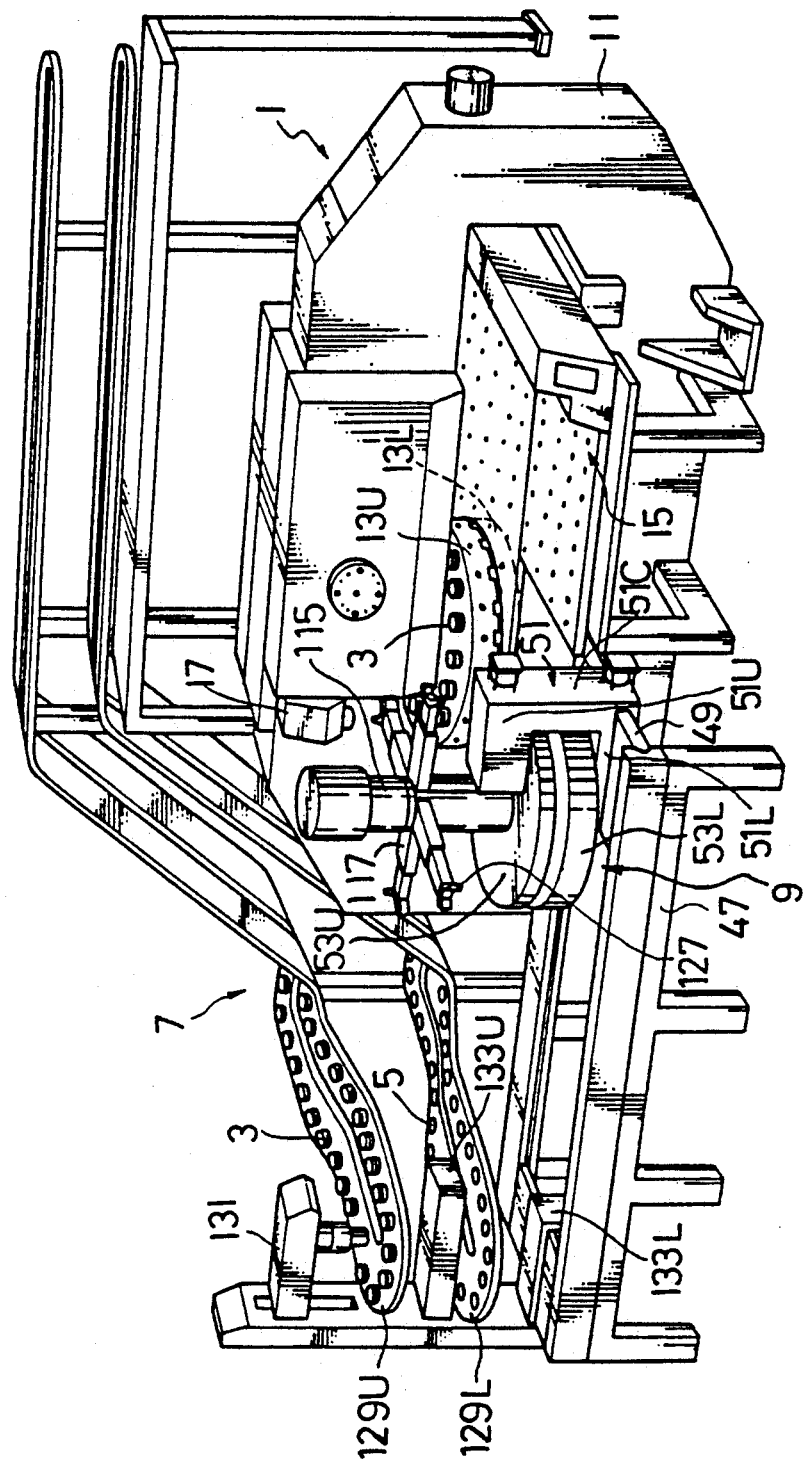
FIG. 1 is a perspective view showing conceptually a whole structure of a first embodiment of the present invention to aid in its explanation. The drawing illustrates the state in which a carriage device is positioned at the side of the turret punch press.
Figure 2:
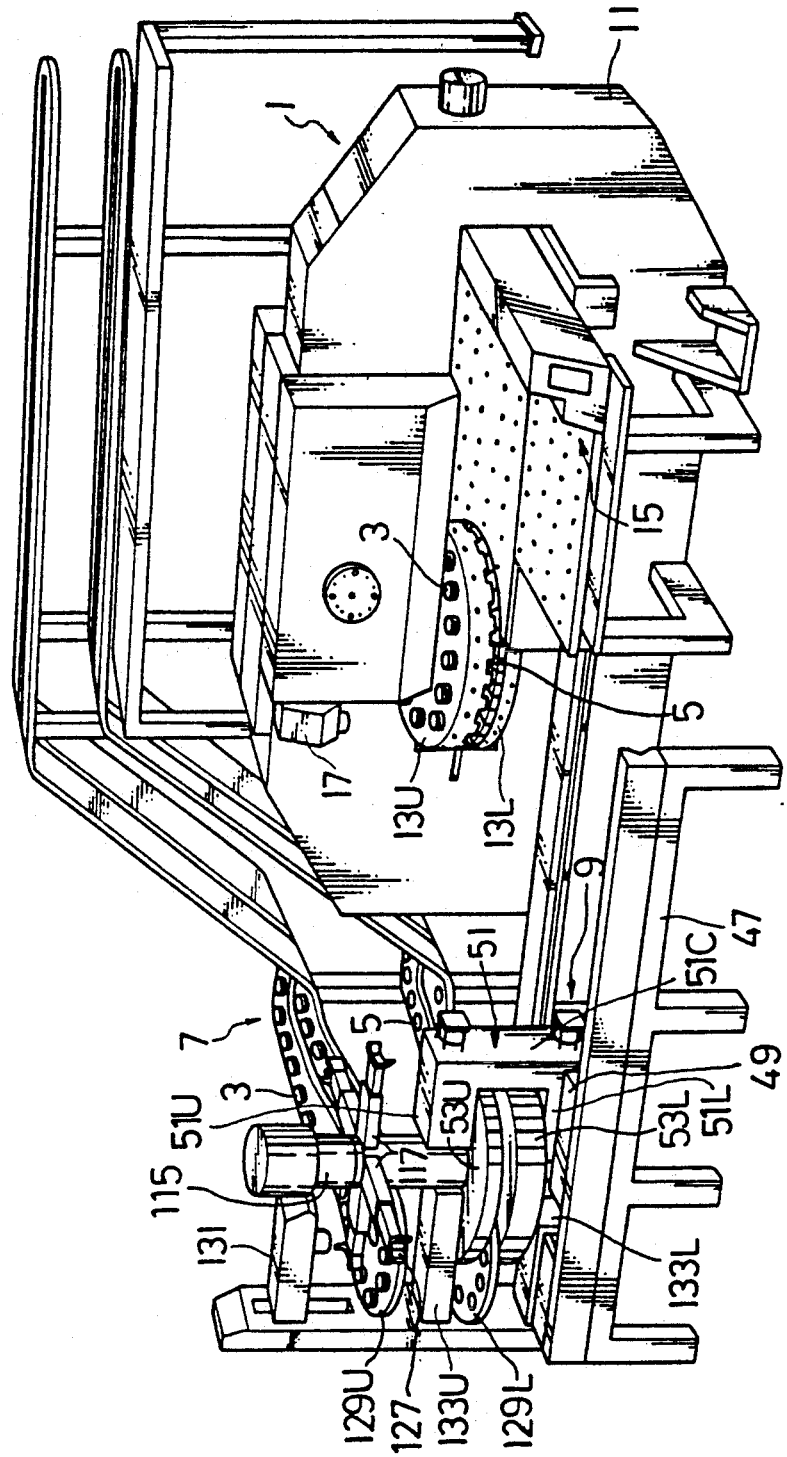
FIG. 2 is the same conceptual perspective view as FIG. 1, illustrating the state in which the carriage device has moved to the side of a tool storage device.

Now referring to FIG. 1 and FIG. 2, these drawings illustrate a first embodiment of a tool changing apparatus of the present invention, and show conceptionally the positional relationship of the parts.

The tool changing apparatus of the first embodiment for a turret punch press 1 includes a tool storage device 7 for storing a plurality of punches 3 and dies 5 used by the turret punch press 1, and a carriage device 9 for moving back and forth between the tool storage device 7 and the turret punch press 1. The carriage device 9, as will be later explained in detail, has the function of changing the punches 3 and the dies 5 on the turret punch press 1 for the punches and dies stored in the tool storage device 7.

The turret punch press 1 is commonly known, so will be described briefly. The turret punch press 1 includes a frame 11 with a bridge structure on which an upper turret disk 13U and lower turret disk 13L are rotatably mounted. A plurality of punches 3 and dies 4 are removably installed on the upper and lower turret disks 13U, 13L respectively. A vertically movable striker (omitted from the drawings) is provided on the frame 11 for striking a punch 3 at a work station, and a workpiece transfer and positioning device 15 is provided on the frame 11 for transferring and positioning a plate workpiece (omitted from the drawings) in the X-axis and Y-axis directions with respect to the work station.

A novel configuration in this embodiment is a punch mounting/dismounting device 17 mounted on the frame 11 whereby the punch 3 mounted on the upper turret disk 13U is picked up from a punch mounting hole (not illustrated) provided on the upper turret disk 13U, and another punch 3 are mounted in the mounting hole for the picked up one 3. In the present instance, the "punch" means a punch set including a punch body for performing punching operation and a cylindrical plate press member for holding down a workpiece to prevent the workpiece from moving laterally during the punching operation.

Figure 3:
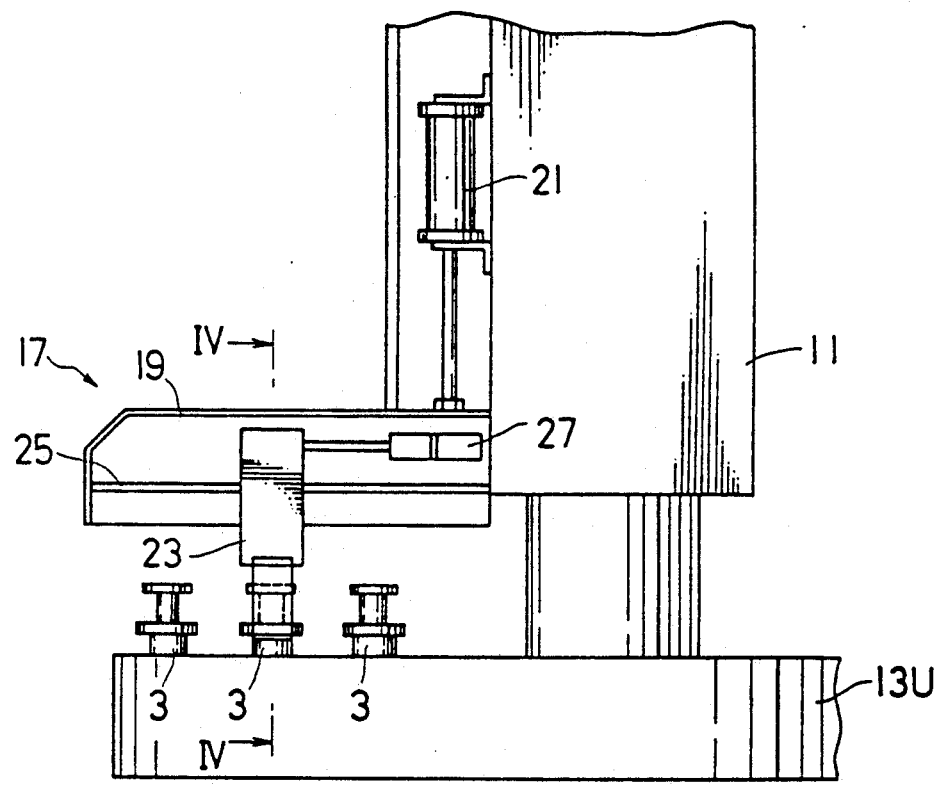
FIG. 3 is a conceptual view for explaining the function of a punch mounting/dismounting device.

More specifically, as shown in FIG. 3, the punch mounting/dismounting device 17 includes an elevating arm 19 extending in the radial direction of the upper turret disk 13U; the elevating arm 19 is mounted for vertical movement on the frame 11 on the upper turret disk 13U. A suitable actuator 27 such as, for example, an air cylinder is mounted on the frame 11 to move the elevating arm 19 in the vertical direction.

A clamping hook device 23 for clamping the punch 3 mounted on the upper turret disk 13U is suspended from the elevating arm 19 for moving laterally along a guide 25 provided on the elevating arm 19. The clamping hook device 23 can be moved to positions corresponding to a plurality of punches 3 (three punches 3 in this embodiment) mounted on the upper turret disk 13U. A cylinder device, for example, a pair of small air cylinder connected in series and capable of moving its output shaft in three stages is used as the actuator 27 for moving the clamping hook device 23 along the guide 25. Another type of actuator may also be used as the actuator 27 so long as it has the function of positioning the clamping hook device 23 at three positions, e.g., inner, outer, and middle, to correspond to the locations of the punches 3 in the radial direction of the upper tueret disk 13U.

Figure 4:
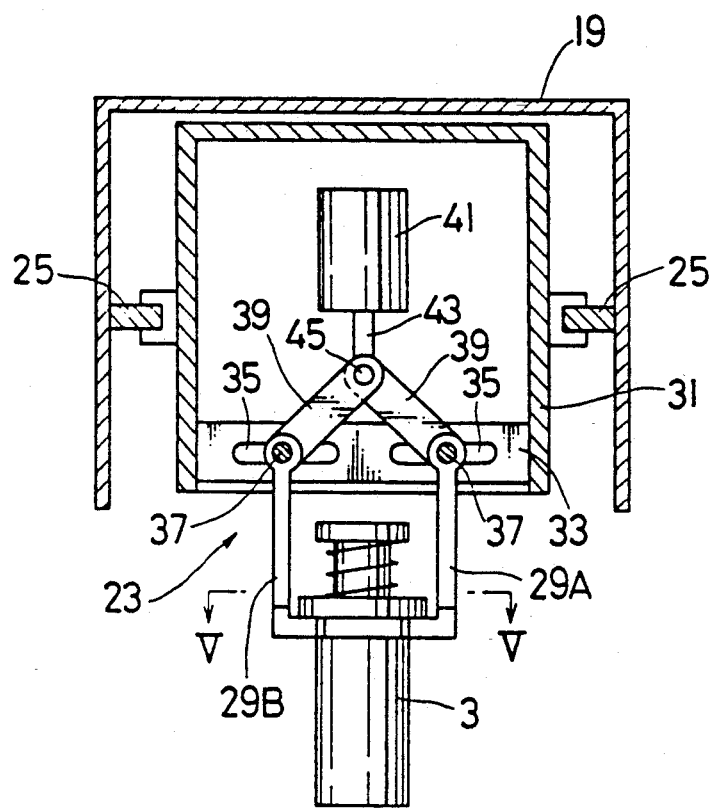
FIG. 4 is an explanatory view corresponding to an expanded sectional view taken along the line IV—IV in FIG. 3.
Figure 5:
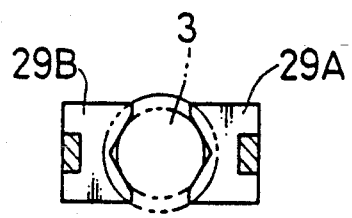
FIG. 5 is a sectional view taken along the line V—V in FIG. 4.

Referring now to FIG. 4, a plurality of clamping hooks 29A, 29B are provided in the clamping hook device 23 to clamp the punch 3. Specifically, the lower ends of the clamping hooks 29A, 29B are bent into an L shape for clamping the punch 3 from above, and a V-shaped holding section (FIG. 5) is formed in the lower end of each hook 29A, 29B to correspond to the dimensions of all sizes of the punch 3, from small to large.

The clamping hooks 29A, 29B are supported for opening and closing movement on guide plates 33 provided in a housing 31 on the clamping hook device 23. Specifically, the upper sections of the clamping hooks 29A, 29B are supported by pins 37 which are slidably supported in guide slots 35 formed in the guide plates 33. A pair of links 39 is provided to cause the pins 37 to slide along the guide slots 35. Specifically, one end of each of a pair of links 39 is connected to each pin 37, and the other end of each link 39 is pivotally connected to an actuator 41 such as, for example, a solenoid or a cylinder, through a pin 45 provided on the free end of an actuator rod 43.

With this configuration of the clamping hook device 23, the clamping hooks 29A, 29B can be moved along the guide slots 35 by the activation of the actuator 41, to open and close and thus to release or clamp the punch 3.

As is obvious from the foregoing explanation, with this embodiment, in the case where a punch is picked up from the upper turret disk 13U, after the elevating arm 19 of the punch mounting/dismounting device 17 descends and the clamping hook device 23 is laterally moved and is positioned to correspond to the position of the punch 3 which is to be changed, the punch 3 is clamped by the clamping hooks 29A, 29B. Following this, the elevating arm 19 of the punch mounting/dismounting device 17 ascends and pick up the punch 3 from the upper turret disk 13U.

Conversely, in the case where a punch is installed on the upper turret disk 13U, the punch mounting/dismounting device 17 is first in an elevated state while clamping another punch 3. Then, the punch mounting-/dismounting device 17 descends so that the other punch 3 can be mounted on the upper turret disk 13U.

As can be understood from FIGS. 1 and 2, the carriage device 9 is provided for moving back and forth between the turret punch press 1 and the tool storage device 7. More specifically, the carriage device 9 is provided with slide base 49 guided by a guide rail 47 laid between the turret punch press 1 and the tool storage device 7. The slide base 49 is moved back and forth through the action of a suitable operating device such as, for example, a cylinder device or a ball screw device or the like (omitted from the drawings).

Figure 6:
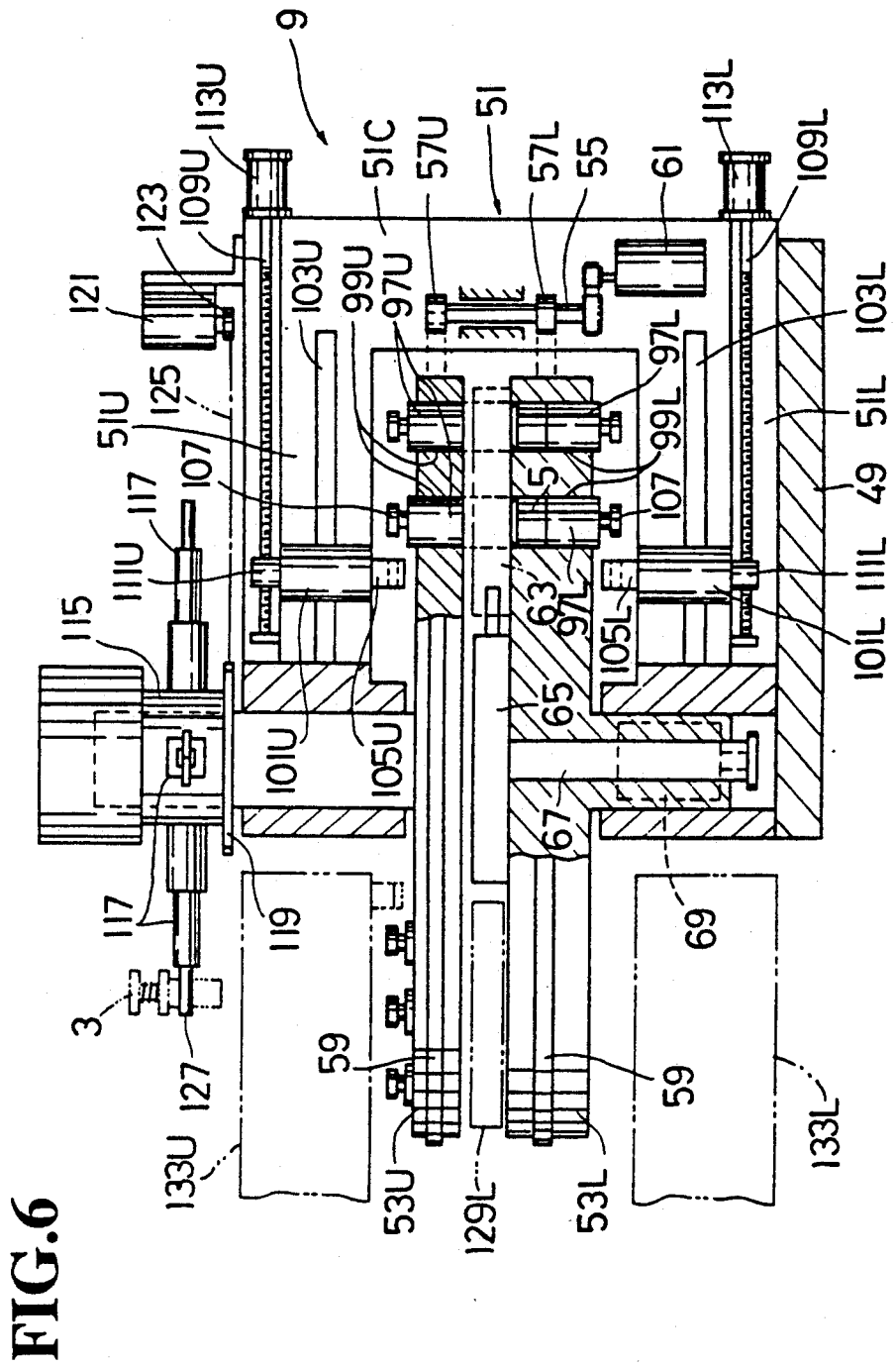
FIG. 6 is a view for explaining the carriage device conceptually and functionally.

Referring now to FIG. 6 as well as FIG. 1, provided on the slide base 49 is a C-frame 51 having a set of upper and lower arm members 51U, 51L and a column member 51C. An upper rotatable disk 53U is rotatably supported on the free end of the upper arm 51U, and a lower rotatable disk 53L opposing the upper rotatable disk 53U is rotatably supported on the free end of the lower arm 51L. The upper and lower rotatable disks 53U, 53L are adapted to rotate in synchronism. To this end, in this embodiment timing belts 59 are fitted around the upper and lower rotatable disks 53U, 53L and around upper and lower sprockets 57U, 57L mounted on a rotary shaft 55 rotatably supported on the column member 51C of the C-frame 51, the rotary shaft 55 being connected to a output shaft of a servo motor 61 mounted on the C-frame 51.

Accordingly, the upper and lower rotatable disks 53U, 53L are rotated in synchronism, driven by the servo motor 61, and the indexing and positioning of the upper and lower rotatable disks 53U, 53L is easily provided by controlling the servo motor 61.

A die holder transfer device 65 is provided on the lower rotatable disk 53L to withdraw the die holder 63 from the lower turret disk 13 onto the lower rotatable disk 53L, and to advance the die holder 63 toward the lower turret disk 13L.

Specifically, the die holder transfer device 65 is installed on a rotary shaft 67 which penetrates a rotary shaft of the lower rotatable disk 53L in a rotatable manner, and the rotary shaft 67 is connected to a servo motor 69 mounted on the lower arm 51L of the C-frame 51. Accordingly, the die holder transfer device 65 can revolve relative to the lower rotatable disk 53L.

Figure 7:
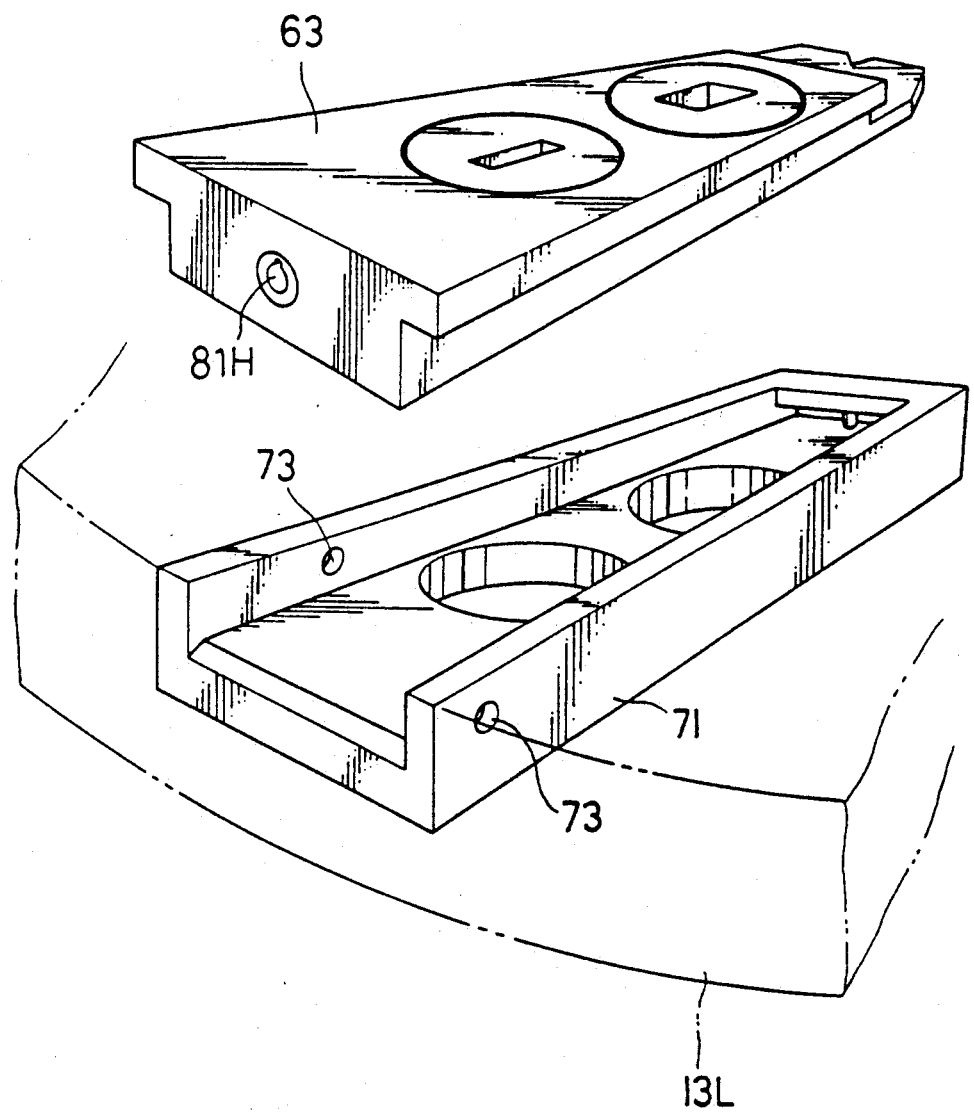
FIG. 7 is a perspective view of a die holder and die support provided on a turret disk.
Figure 8:
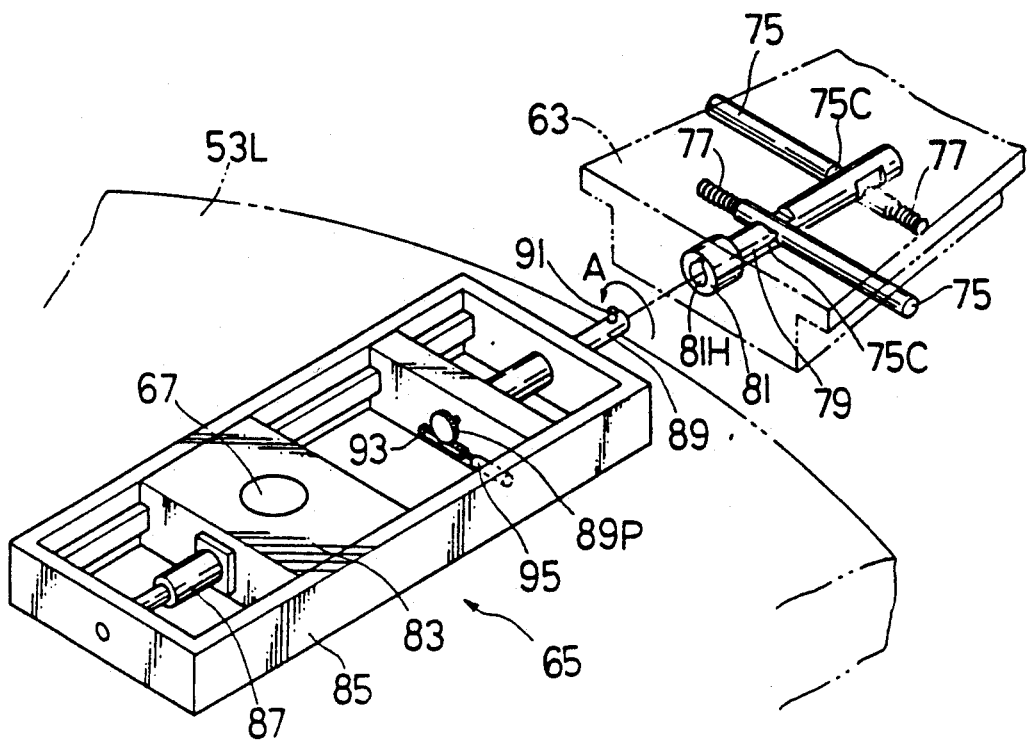
FIG. 8 is a view for explaining the die holder and the die holder transfer device conceptually and functionally.

Referring now to FIG. 7, the die holder 63 is supported on a die support 71 secured to the lower turret disk 13L. The die holder 63 is slidable along the die support 71 toward the outside of the turret disk 13L, and is removable from the die support 71. As shown in FIG. 8, provided on the die holder 63 is an engaging pin 75 adapted to be inserted into a pin engaging hole 73 (FIG. 7) formed in the die support 71, so that the die holder 63 is locked in the die support 71.

Each engaging pin 75 is urged sideways by a spring 77, and projects freely from the side of the die holder 63. A cam shaft 79 is rotatably provided in the die holder 63 to engage with a notch section 75C formed in each engaging pin 75 and causes the engaging pin 75 to retract into the die holder 63 against the resilience of the spring 77. An engaging head 81 having an engaging hole 81H is integrally provided on the end of the cam shaft 79. As can be readily understood from FIG. 8, the engaging pins 75 are retracted into the die holder 63 by the rotation of the cam shaft 79 in the direction indicated by an arrow A.

As shown in FIG. 8, the die holder transfer device 65 is adapted to move back and forth in the radial direction of the lower rotatable disk 53L to withdraw the die holder 63 from and advance the die holder 63 toward the lower turret disk 13L. Specifically, a sliding member 85 is supported on a guide block 83 secured to the rotary shaft 67; the sliding member 85 is slidable in the radial direction of the lower rotatable disk 53L. A suitable actuator 87 such as, for example, an air cylinder, is provided between the guide block 83 and the sliding member 85. A linear motor may also be used for the actuator 87 with the guide block 83 as a stator and the sliding member 85 as a rotor.

Figure 9:
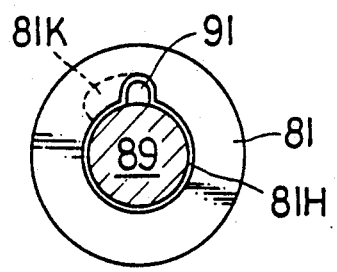
FIG. 9 is a view for explaining a hole formed in the die holder.

A hook shaft 89 of which an end section is insertable in the engaging hole 81H of the engaging plate 81 of the die holder 63 is provided on the end of the sliding member 85 for rotation in the direction of the arrow A. A hook pin 91 which is engageable in a hooking hole 81K (FIG. 9) formed inside the engaging hole 81H is provided at the free end of the hook shaft 89. In addition, a rotation device for rotating the hook shaft 89 is provided at the end of the sliding member 85; specifically, a pinion 89P is provided on the base of the hook shaft 89, and a rack 93 adapted to engage with the pinion 89P is fixed to an output shaft of an actuator 95 such as a minicylinder or a solenoid.

With this configuration, the sliding member 85 is moved toward the lower turret disk 13L by the action of the actuator 87, and after the free end of the hook shaft 89 provided on the sliding member 85 is inserted into the engaging hole 81H on the die holder 63, the actuator 95 is activated to rotate the hook shaft 89 in the direction of the arrow A. The rotation of the hook shaft 89 causes the hook pin 91 to enter the hooking hole 81K so that the cam shaft 79 is rotated in the direction of the arrow A.

Accordingly, the engaging pins 75 are retracted against the resistance of the respective springs 77 into the die holder 63, and the engaging pins 75 are disengaged from the pin engaging hole 73 of the die support 71. It then becomes possible to withdraw the die holder 63 from the die support 71. Accordingly, the die holder 63 can be moved onto the lower rotatable disk 53L by drawing the sliding member 85. In this manner, the die holder 63 can be transferred from the lower turret disk 13L onto the lower rotatable disk 53L of the carriage device 9.

Referring again to FIG. 6, a die mounting/dismounting device is provided on the upper and lower rotatable disks 53U, 53L for mounting a die on and dismounting a die 5 from the die holder 63 which has been moved onto the lower rotatable disk 53L. Specifically, a plurality of upper plunger insertion holes 99U into which upper plungers 97U are vertically movably inserted, are formed in a plurality of locations (two locations are shown in FIG. 6) in the upper rotatable disk 53U. In addition, a plurality of lower plunger insertion holes 99L in which a lower plunger 97L are vertically movably inserted opposing the upper plunger 97U, are formed in the lower rotatable disk 53L, the plunger insertion holes 99L being dimensioned so that the die 5 is inserted thereinto from above.

An upper cylinder 101U is provided on the upper arm 51U to move vertically the upper plunger 97U, and a lower cylinder 101L is provided on the lower arm 51L to move vertically the lower plunger 97L. Specifically, the upper and lower cylinders 101U and 101L are slidably supported on a guides 103U, and 103L provided on the upper and lower arms 51U, 51L respectively. More specifically, the upper and lower cylinders 101U, 101L are provided with a vertically movable upper piston rod 105U and lower piston rod 105L respectively, and a T-shaped channel (FIGS. 14-18) is formed on each of the upper and the lower piston rods 105U and 105L for engaging with a T-shaped projection 107 each provided on each of the upper and lower plungers 97U, 97L.

As shown in FIG. 6, a pair of threaded rods 109U, 109L are rotatably provided on the upper and lower arms 51U, 51L respectively for moving the upper and lower cylinders 101U, 101L laterally along the guides 103U, 103L, and a pair of nuts 111U, 111L provided on the respective upper and lower cylinders 101U, 101L are screwed onto the rods 109U, 109L.

Accordingly, the upper and lower cylinders 101U, 101L are moved laterally from the rotation of the upper and lower threaded rods 109U, 109L respectively by means of a pair of servo motors 113U, 113L mounted at the top and bottom of the C-frame 51. When the upper and lower cylinders 101U, 101L are moved laterally along the guides 103U, 103L and stopped at positions corresponding to the plungers 97U, 97L, the T-shaped projections 107 of the upper and lower plungers 97U, 97L are inserted into the T-shaped channels of the piston rods 105U, 105L so that the cylinders 101U, 101L are engaged with the upper and lower plungers 97U, 97L.

Thereafter, when the upper and lower cylinders 101U, 101L are actuated, the upper and lower plungers 97U, 97L are moved vertically. Accordingly, the die 5 can be removed from the die holder 63 by pressing down the die 5 from the die holder 63 positioned on the lower rotatable disk 53L to the lower rotatable disk 53L by the upper plunger 97U. Conversely, a die 5 can be moved onto the die holder 63 by pressing up the die 5 from the lower rotatable disk 53L using the lower plunger 97L.

Figure 10:
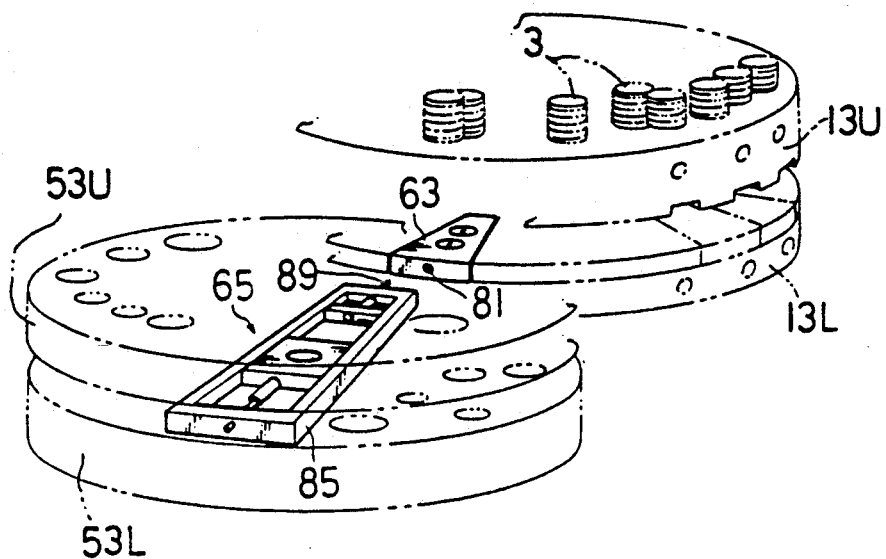
FIG. 10 is a view for explaining the mounting and dismounting operation of the die holder.

As is readily apparent from the foregoing explanation, in the case where the die 5 on the lower turret disk 13L is changed, when the carriage device 9 is positioned at the side of the upper and lower turret disks 13U, 13L, the die holder transfer device 65 is revolved by the rotary shaft 67 so that the longitudinal axis of the sliding member 85 is directed to the lower turret disk 13L, as shown in FIG. 10.

Figure 11:
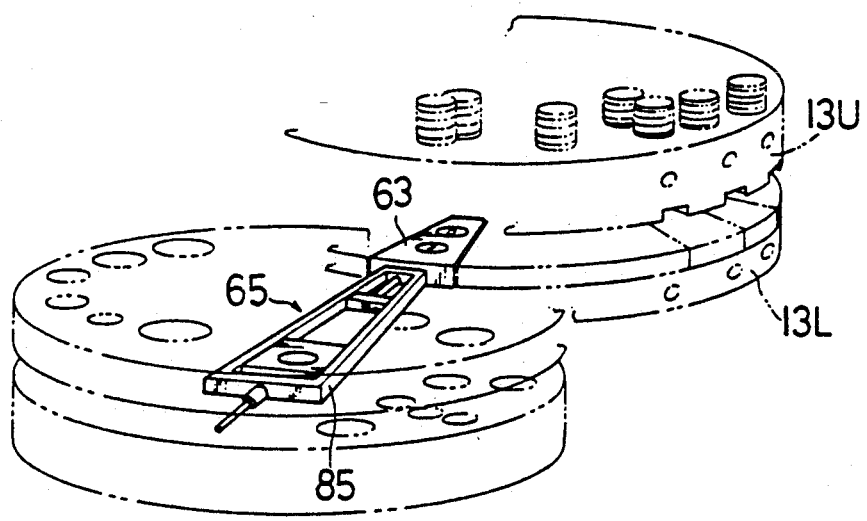
FIG. 11 is another view for explaining the mounting and dismounting operation of the die holder.
Figure 12:
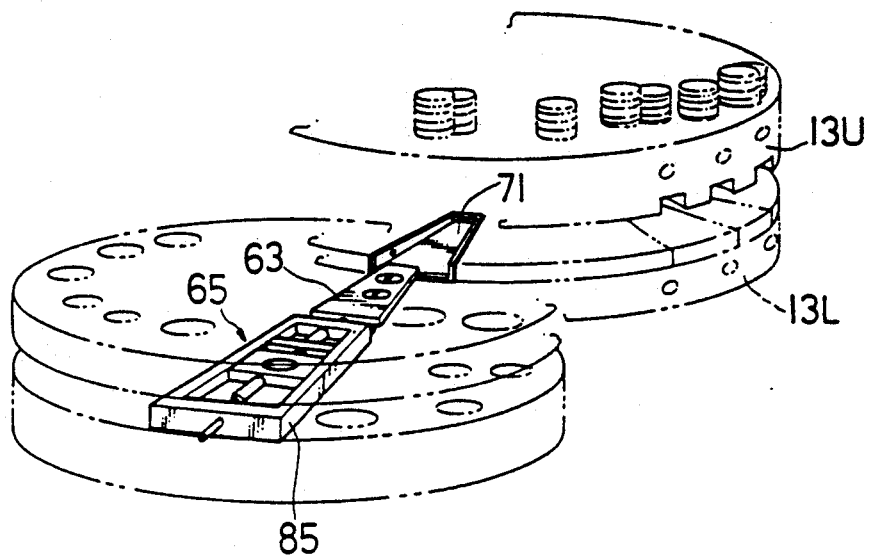
FIG. 12 is yet another view for explaining the mounting and dismounting operation of the die holder.
Figure 13:
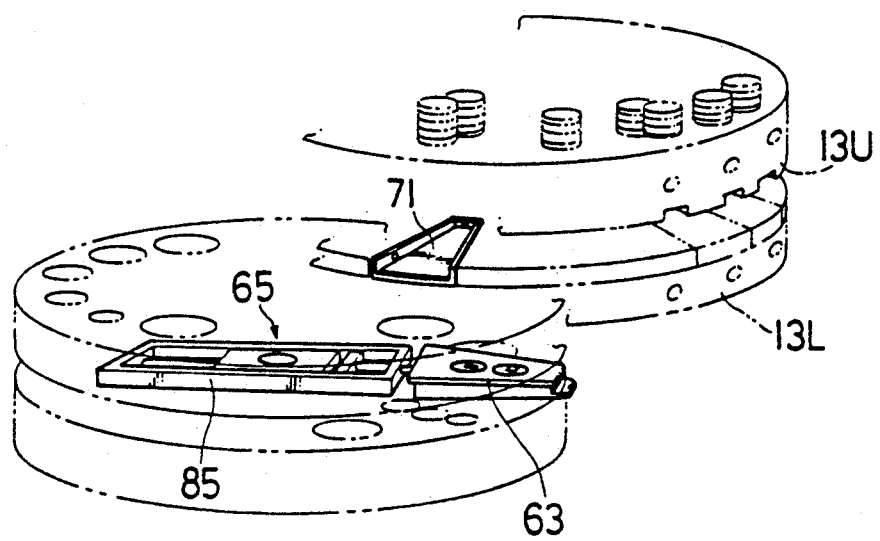
FIG. 13 is yet another view for explaining the mounting and dismounting operation of the die holder.

Next, as shown in FIG. 11, the sliding member 85 is moved toward the lower turret disk 13L, and as previously described, is engaged with the die holder 63 by the hook shaft 89. The die holder 63 is then withdrawn and transferred onto the lower rotatable disk 53L, as shown in FIG. 12. The die holder transfer device 65 is then revolved to a position corresponding to the upper and lower arms 51U, 51L of the C-frame 51, as shown in FIG. 13.

Figure 14:
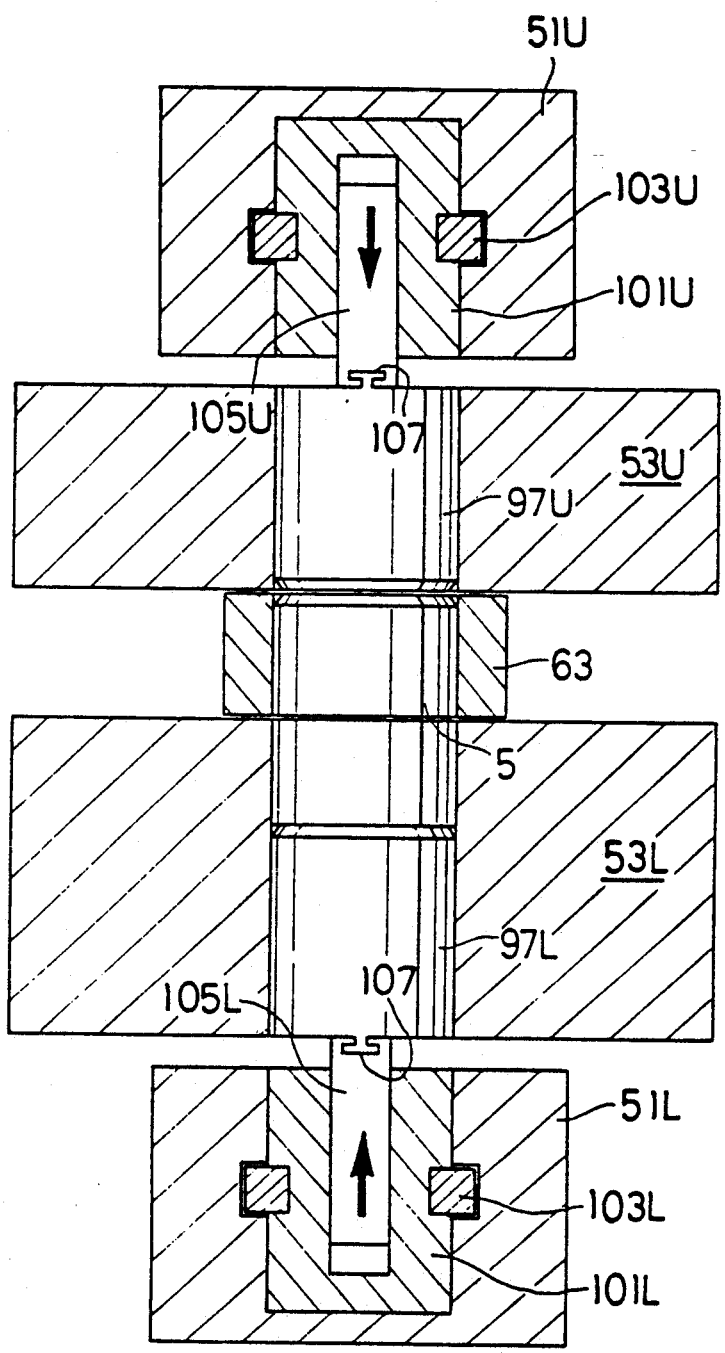
FIG. 14 is a view for explaining the mounting/dismounting operation of the die with respect to the die holder.
Figure 15:
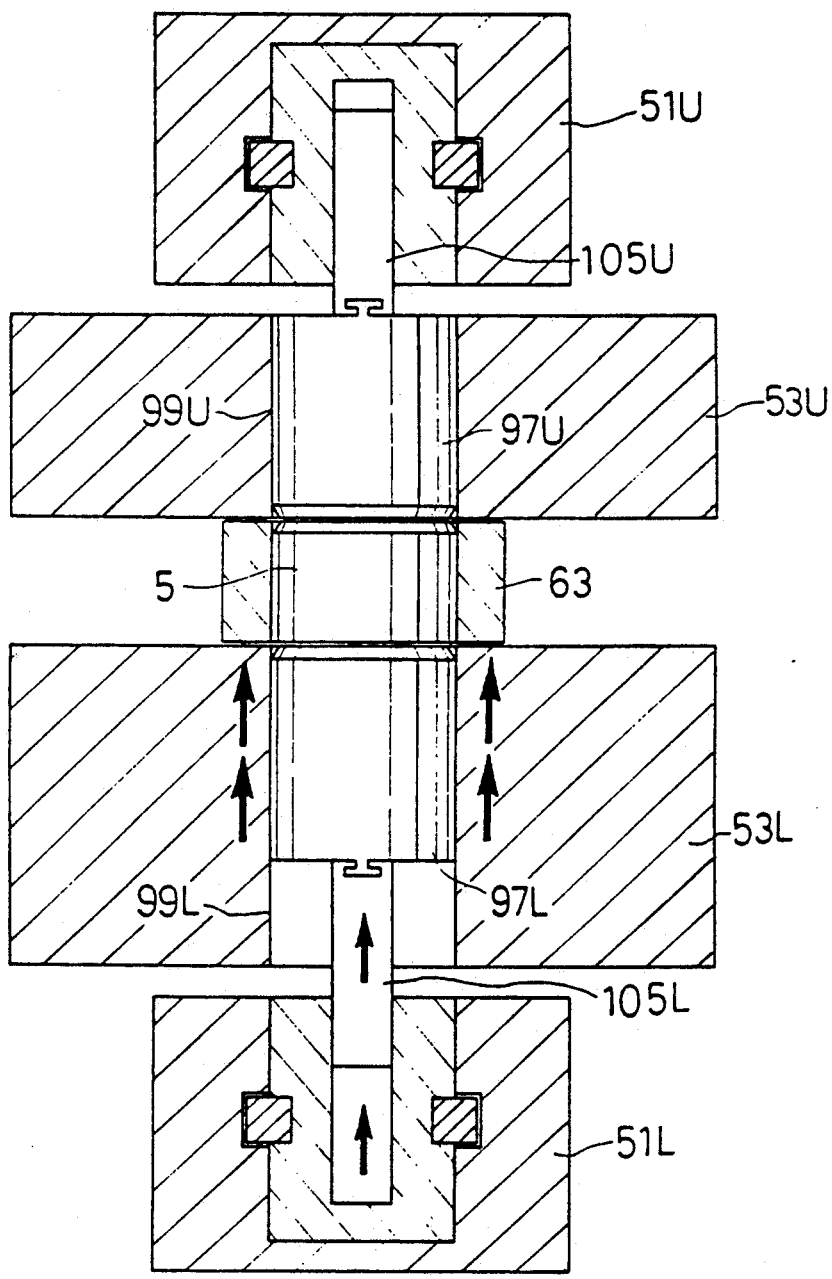
FIG. 15 is another view for explaining the mounting/dismounting operation of the die with respect to the die holder.

Next, the upper and lower rotatable disks 53U, 53L are rotated until a pair of plunger insertion holes 99U, 99L (FIG. 6) whose dimensions correspond to the radius of the die 5 held in the die holder 63, is located above and below the die holder 63 respectively. Following this, the upper and lower cylinders 101U, 101L are connected to the upper and lower plungers 97U, 97L respectively. As shown in FIG. 14, the upper plunger 97U is then caused to descend and the lower plunger 97L caused to ascend so that the die 5 held in the die holder 63 is interposedly maintained between the plungers 97U, 97L (FIG. 15).

Figure 16:
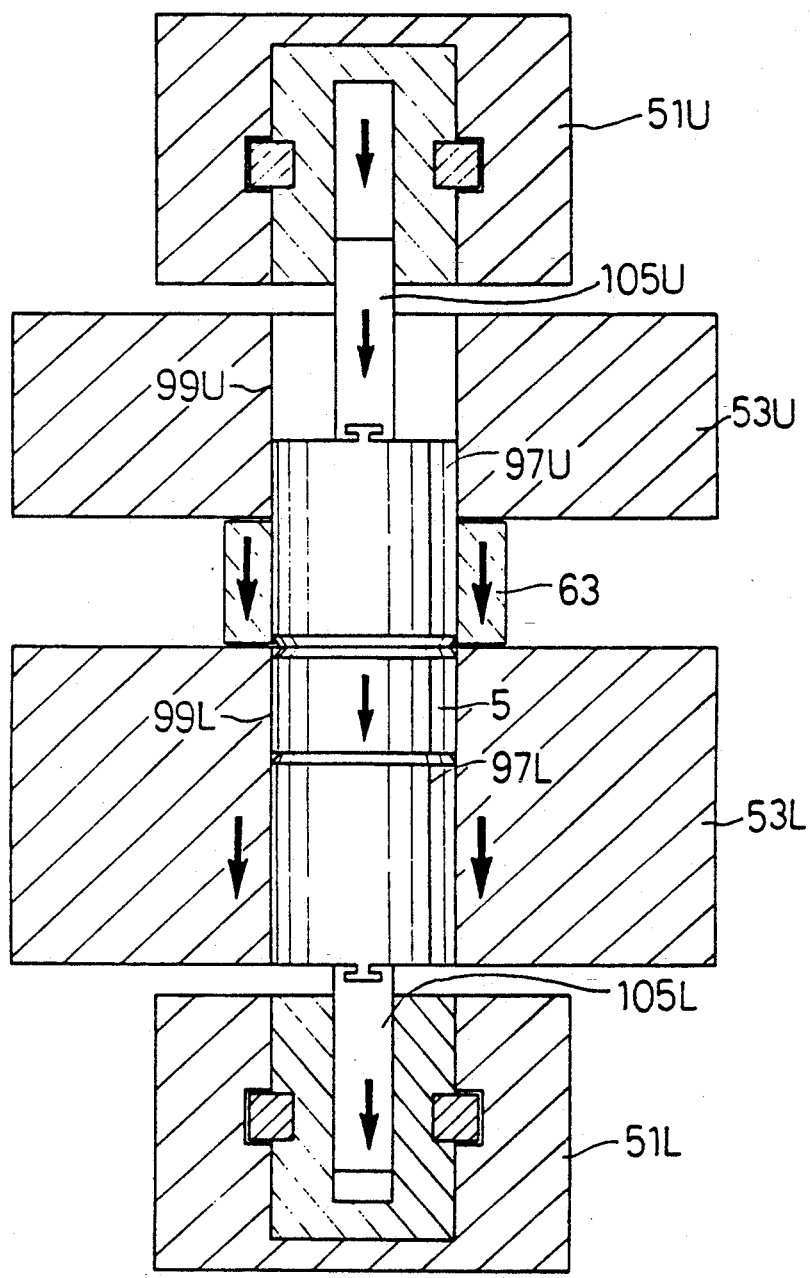
FIG. 16 is yet another view for explaining the mounting/dismounting operation of the die with respect to the die holder.
Figure 17:
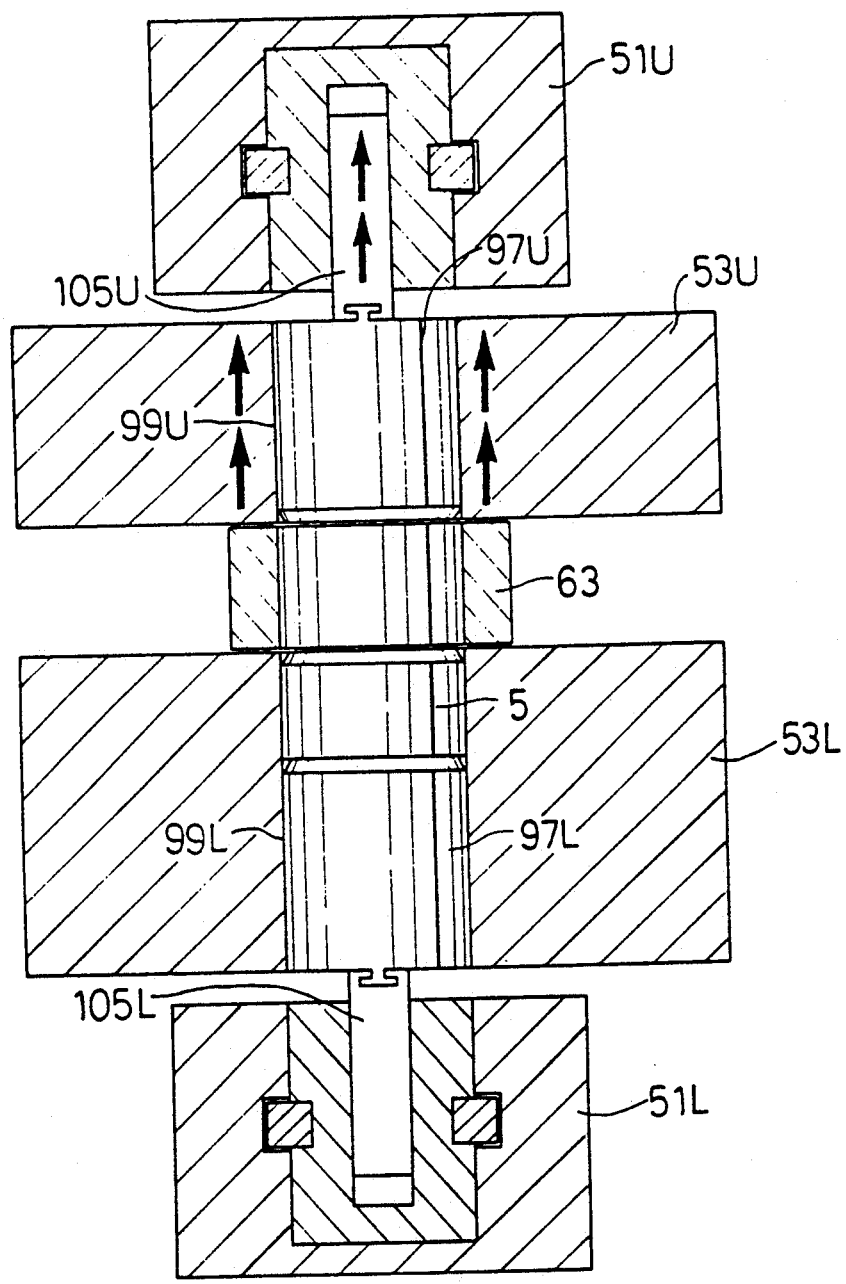
FIG. 17 is yet another view for explaining the mounting/dismounting operation of the die with respect to the die holder.
Figure 18:
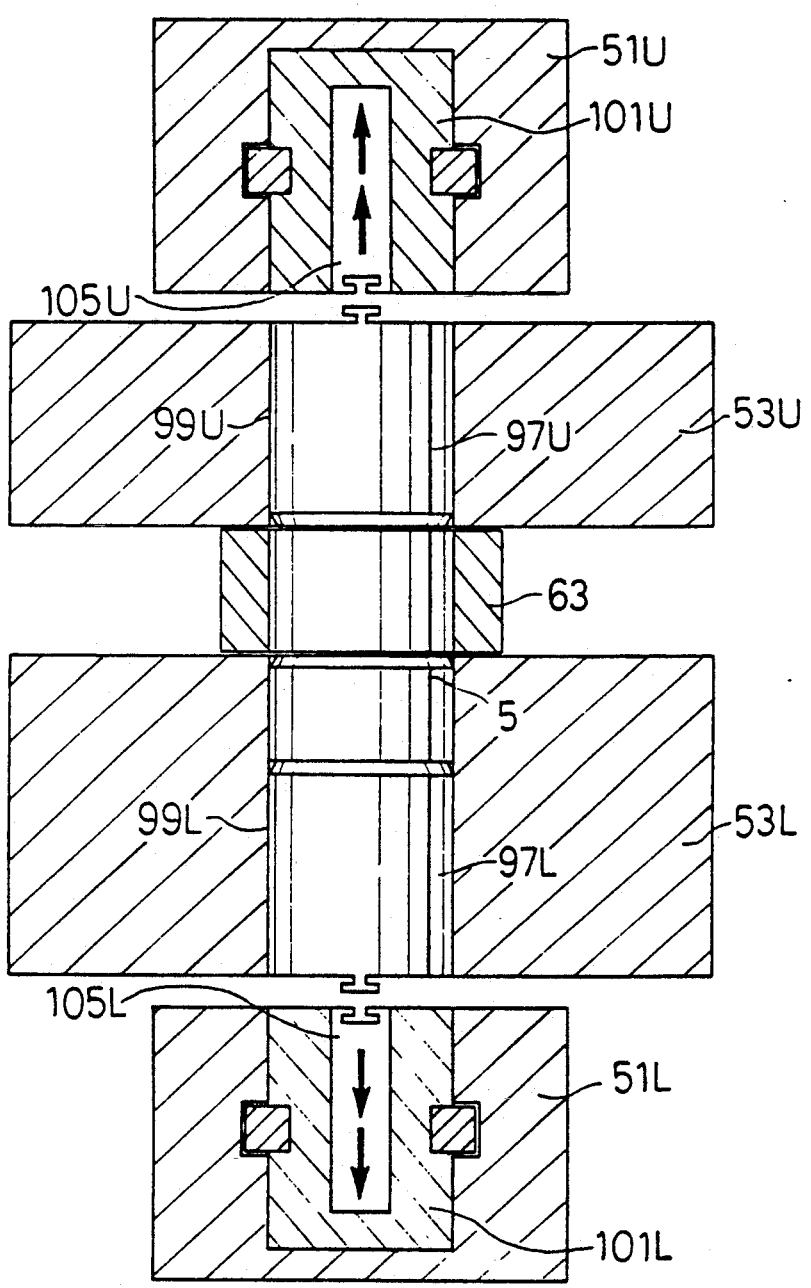
FIG. 18 is yet another view for explaining the mounting/dismounting operation of the die with respect to the die holder.

As shown in FIG. 16, with the die 5 interposedly maintained between the upper and lower plungers 97U, 97L, the die 5 is then pressed down into the plunger insertion hole 99L in the lower rotatable disk 53L. The upper plunger 97U then ascends to return to the home position as shown in FIG. 17. In this manner, the die 5 is removed from the die holder 63.

After the die 5 is removed from the die holder 63, the upper and lower cylinders 101U, 101L are disconnected from the upper and lower plungers 97U, 97L, and the upper and lower rotatable disks 53U, 53L are revolved until a lower plunger insert hole 99L in which another die 5 is housed is located below the die holder 63.

Then, an operation which is the reverse of the operation whereby the die 5 was removed from the die holder 63 is performed, and after the die 5 from the lower rotatable disk 53L is mounted in the die holder 63, the die holder 63 is advanced toward the lower turret disk 13L, and is mounted on the die support 71 of the lower turret disk 13L.

In this manner, changing of the die 5 in the die holder 63 is carried out. As can be readily understood from the above description, in the present embodiment, while the die 5 is being interposed between the upper and lower plungers 97U, 97L, the die 5 in the die holder 63 is smoothly changed so that no chafing occurs at the die 5 in the die mounting hole of the die holder 63.

In the above description, although detailed explanation was omitted, it is to be understood that the die 5 is firmly maintained without concern about accidental disengagement through a plurality of commonly known ball plungers in the die holder 63.

Referring again to FIGS. 1, 2, and 6, a rotatable arm holder 115 is provided at the upper end section of the upper arm 51U of the carriage device 9 for delivering the punch 3 to and picking up the punch from the punch mounting/dismounting device 17. Provided on the arm holder 115 is a plurality of punch holding arms (four holding arms in the present embodiment) 117 freely extendable and retractable in the radial direction.

As best shown in FIG. 6, in order to rotate the arm holder 115, a chain or a timing belt 125 is fitted around a sprocket 119 installed on the arm holder 115 and a drive sprocket 123 mounted on a servo motor 121 provided on the C-frame 51. The punch holding arm 117 is provided freely extendable and retractable, using for example, the same structure found in a usual robot hand, and a finger 127 is provided on the free end of the punch holding arm 117 to hold the punch 3, which finger is the same type of finger found on the usual robot hand.

With this arrangement of the punch holding arm 117, while the die 5 on the die holder 63 is being changed, changing of a plurality of the punches 3 can be carried out simultaneously by sequentially rotating and indexing each punch holding arm 117 with respect to the punch mounting/dismounting device 17. In the present embodiment illustrated in FIGS. 1 and 2, three punches can be changed simultaneously because the carriage device 9 has four punch holding arms 117 and one of the punch holding arms 117 must be empty to accept a punch 3 from the punch mounting/dismounting device 17.

Referring again to FIG. 1 and FIG. 2, the tool storage device 7 is provided with an upper running belt 129U for supporting a plurality of punches 3, and a lower running belt 129L for supporting a plurality of dies 5; the punch 3 and the die 5 corresponding to each other are supported on the upper and the lower belt 129U, 129L respectively in a manner opposing each other in the vertical direction.

The tool storage device 7 is provided with a punch mounting/dismounting device 131 for picking up the punch 3 from and mounting the punch on the upper belt 129U at a tool changing position where the path of the upper and lower belts 129U, 129L and the path of the carriage device 9 intersect each other. The punch mounting/dismounting device 131 has the same structure as the punch mounting/dismounting device 17 mounted on the turret punch press 1, therefore a further detailed description of its structure and operation will be omitted. The punch holding arm 117 is adapted to deliver the punch 3 to and receive the punch from the punch mounting/dismounting device 131 when the carriage device 9 is located in the tool changing position.

As illustrated in FIG. 6, when the carriage device 9 is moved to the tool changing position on the tool storage device 7, the lower belt 129L of the tool storage device 7 enters between the upper and lower rotatable disks 53U, 53L. A die 5 in the lower belt 129L is then changed in the same manner used to change as the die 5 in the die holder 63. Specifically, the tool storage device 7 is provided with an upper arm 133U and a lower arm 133L respectively (FIGS. 1, 2, and 6), each arm including a built-in upper or lower movable cylinder (omitted from the drawings) that is substantially the same as the upper or lower cylinder 101U, 101L on the upper or lower arms 51U, 51L of the C-frame 51. The structure for moving the cylinders on the upper and lower arms 133U, 133L is the same as the structure for moving the upper and lower cylinders 101U, 101L on the upper and lower arms 51U, 51L of the C-frame 51, therefore a further detailed description of the structure and operation will be omitted.

Figure 19:
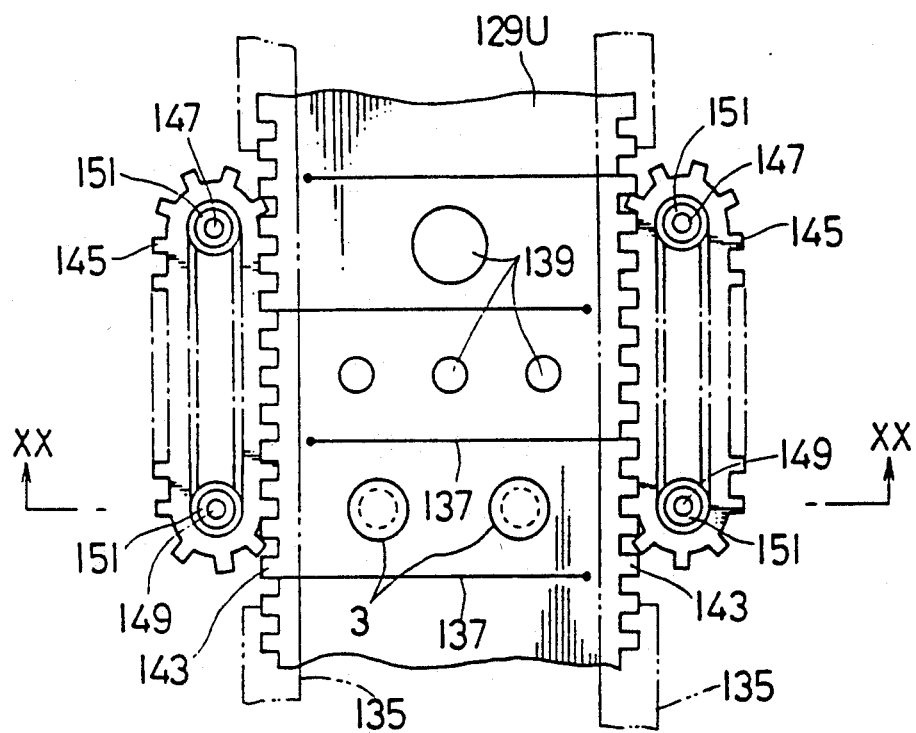
FIG. 19 is view for explaining the drive system for a belt of a tool storage device.
Figure 20:
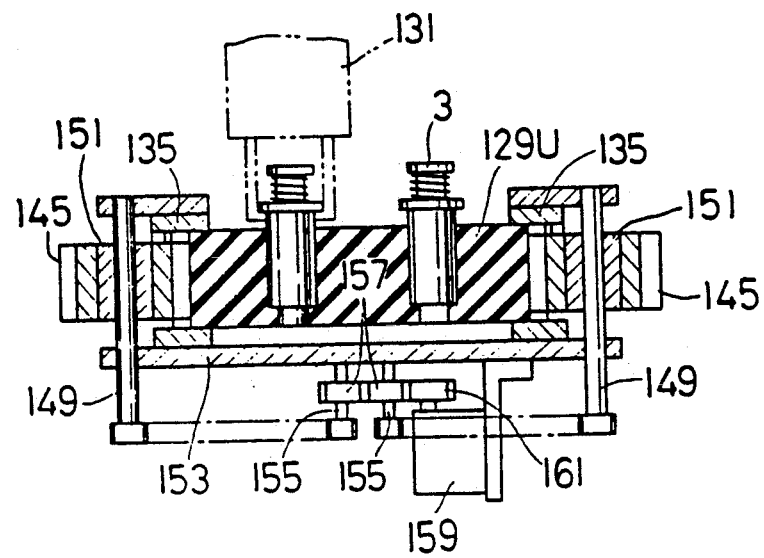
FIG. 20 is a sectional view taken along the line XX—XX in FIG. 19.
Figure 21:
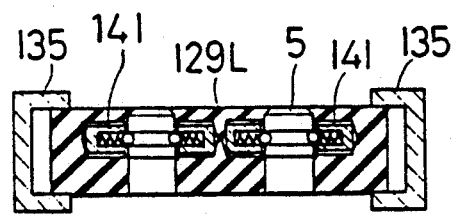
FIG. 21 is an explanatory view illustrating the die mounted on the belt.

Referring again to FIGS. 1 and 2, the upper and lower belts 129U, 129L are made of comparatively thick rubber, and are adapted to move in the three dimensional directions. Referring now to FIGS. 19 to 21, in order to guide and support the upper and lower belts 129U, 129L, the tool storage device 7 is provided with a guide 135 (FIGS. 20 and 21) with a C-shaped cross section on each side of these belts 129U, 129L. In order to improve their flexibility in the directions parallel to the surface thereof, a plurality of slots 137 is formed alternately from each side of the upper and lower belts 129U, 129L. A mounting hole 139 in which the die 5 is inserted is formed in each of the block sections demarcated by the slots 137; the die 5 is firmly maintained in the mounting hole 139 through a plurality of ball plungers 141 provided in the lower belt 129L.

In order to cause the upper belt 129U to run along the guide 135, a toothed section 143 are formed on each side of the upper belt 129U, and in a position where the upper belt 129U is running linearly, the toothed section 143 are engaged with a toothed drive belts 145.

Each toothed drive belt 145 is fitted around a sprockets 151 mounted on a rotary shaft 147 and a sprocket 151 mounted on a rotary shaft 149, the rotary shafts 147, 149 being rotatably supported through a plurality of brackets on the guide 135. In order to drive each of the two drive belts 145, the respective rotary shaft 149 is connected through a timing belt to a countershaft 155 (FIG. 20) rotatably supported on a bracket 153. The two counter-shaft 155 are provided with respective gears 157 engaging with each other, and both gears 157 are driven by a servomotor 159 through a drive gear 161 engaging with one of the gears 157. Accordingly, the drive belt 145 is driven in the respective reverse direction by the driving action of the servo motor 159, causing the upper belt 129U to run.

The lower belt 129L is also caused to runs by the same configuration as described above. In addition, the upper and lower belts 129U, 129L is adapted to run in synchronization by a suitable means.

As can be readily understood from the foregoing description, with this embodiment of the present invention, a desired punch 3 and die 5 on the belt 129U, 129L can be selected by causing the upper and lower belts 129U, 129L to run and by positioning the desired punch 3 and die 5 in the tool changing position. The punch mounting/dismounting device is then actuated to change a punch 3 on the upper belt 129U, and the die mounting/dismounting device is actuated to change a die 5 on the lower belt 129L. Specifically, with this embodiment, while the punching operation is being performed by the turret punch press 1, it is possible to prepare the next punches 3 and dies 5 to be used, and hold them on the punch holding arms 117 and on the lower rotatable disk 53L respectively.

Figure 22:
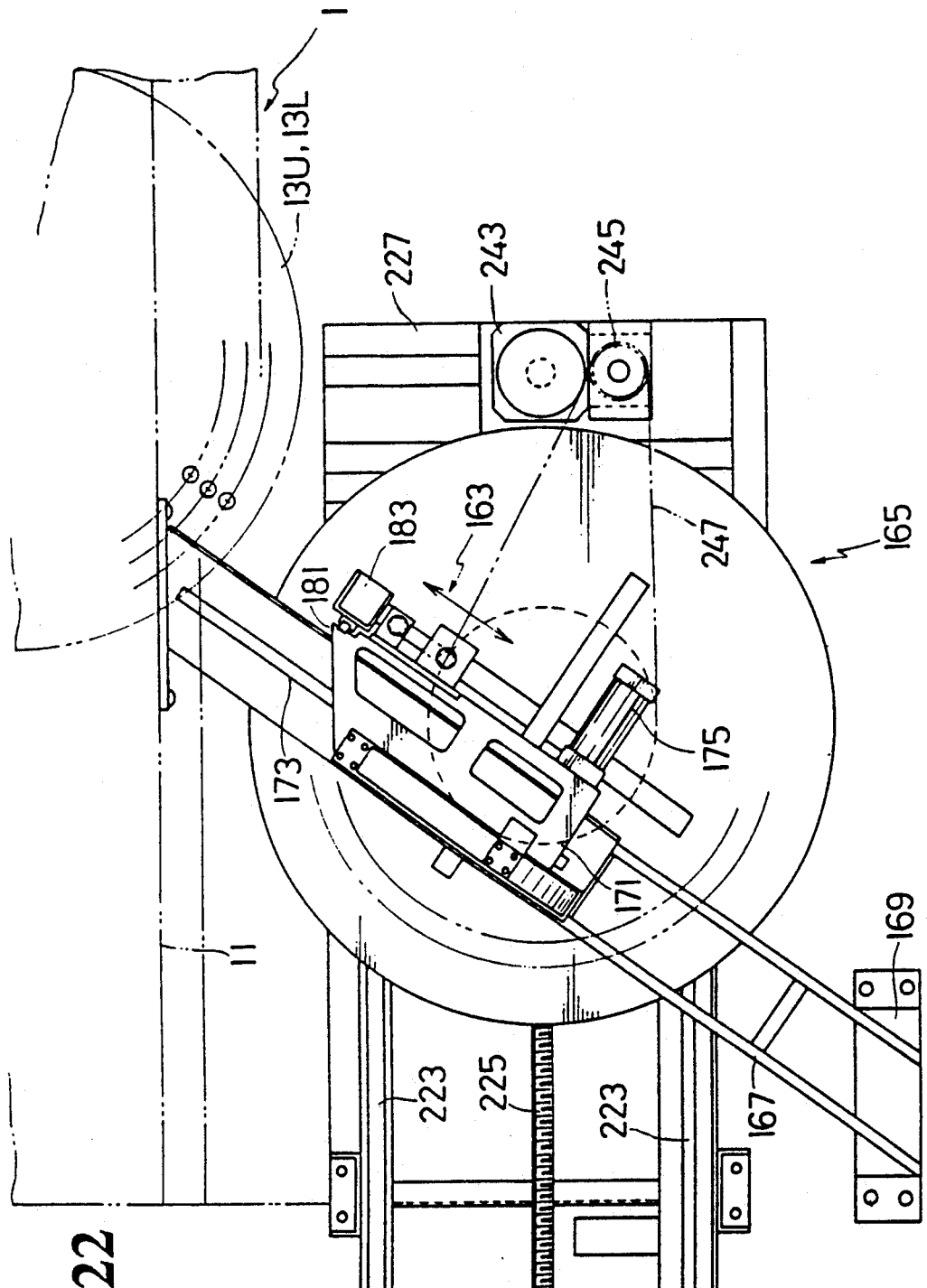
FIG. 22 is an explanatory plan view showing a second embodiment of the present invention.

FIG. 22 and the subsequent drawings illustrate a second embodiment of the present invention. FIG. 22 is a plan view showing the positional relationship of the turret punch press 1, a punch mounting/dismounting device 163, and a carriage device 165.

In the second embodiment of the present invention, the punch mounting/dismounting device 163 is adapted to move back and forth between a position above the turret punch press 1 and a position above the carriage device 165. The carriage device 165 is adapted move back and forth between a position beside the turret punch press 1 and a position beside the tool storage device (omitted from the drawings for the second embodiment).

More specifically, a guide beam 167 which extends substantially in the radial direction of the turret disks 13U, 13L is provided over the carriage device 165. One end of the guide beam 167 is mounted on the side surface of the frame 11 of the turret punch press 1 and the other end is supported on a support column 169 erected in a position at the side of the frame 11. A sliding member 171 is slidably supported on the guide beam 167; specifically, the sliding member 171 is guided by a guide 173 mounted on the guide beam 167.

A servo motor 175 for moving the sliding member 171 along the guide 173 is mounted on the sliding member 171. A pinion gear (omitted from the drawing) mounted on the output shaft of the servo motor 175 engages with a rack 177 (FIG. 23) provided parallel to the guide 173. Accordingly, the sliding member 171 can be moved back and forth along the guide 173 by the forward or reverse rotation of the servo motor 175.

Figure 23:
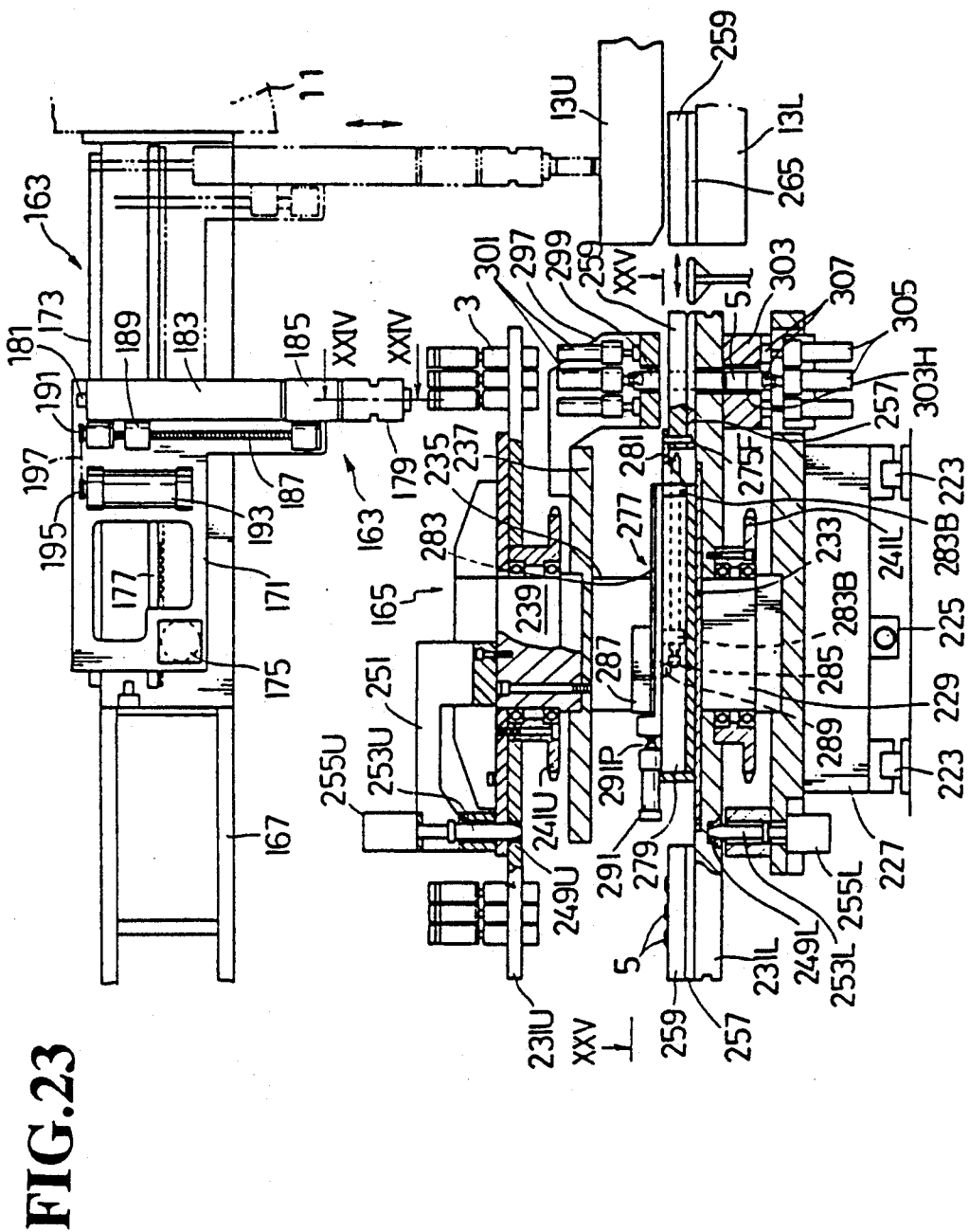
FIG. 23 is an explanatory sectional view showing the main parts of the second embodiment.

As best shown in FIG. 23, in order to change the punch 3 on the upper turret disk 13U or on the carriage device 165, a punch clamp 179 for clamping the head of the punch 3 is vertically movably provided on the slide member 171.

More specifically, a vertical guide 181 is provided on the sliding member 171, and a punch lifter 183 is supported for vertical movement on the guide 181; the punch clamp 179 is supported on the lower part of a punch lifter 183 through an aligning member 185 adapted to align the longitudinal axis of the punch clamp 179 with that of the punch lifter 183. In order to move the punch lifter 183 vertically along the guide 181A, a rotatable threaded rod 187 parallel to the guide 181 is provided on the sliding member 171. The threaded rod 187 is screwed into a nut 189 fixed to the punch lifter 183. A chain or timing belt 197 is fitted around a sprocket 191 provided on the upper end of the threaded rod 187 and a drive sprocket 195 mounted on the output shaft of a servo motor 193 installed on the sliding member 171. Accordingly, the punch lifter 183 and the punch clamp 179 can move upwardly and downwardly by actuation of the servo motor 193.

Figure 24:
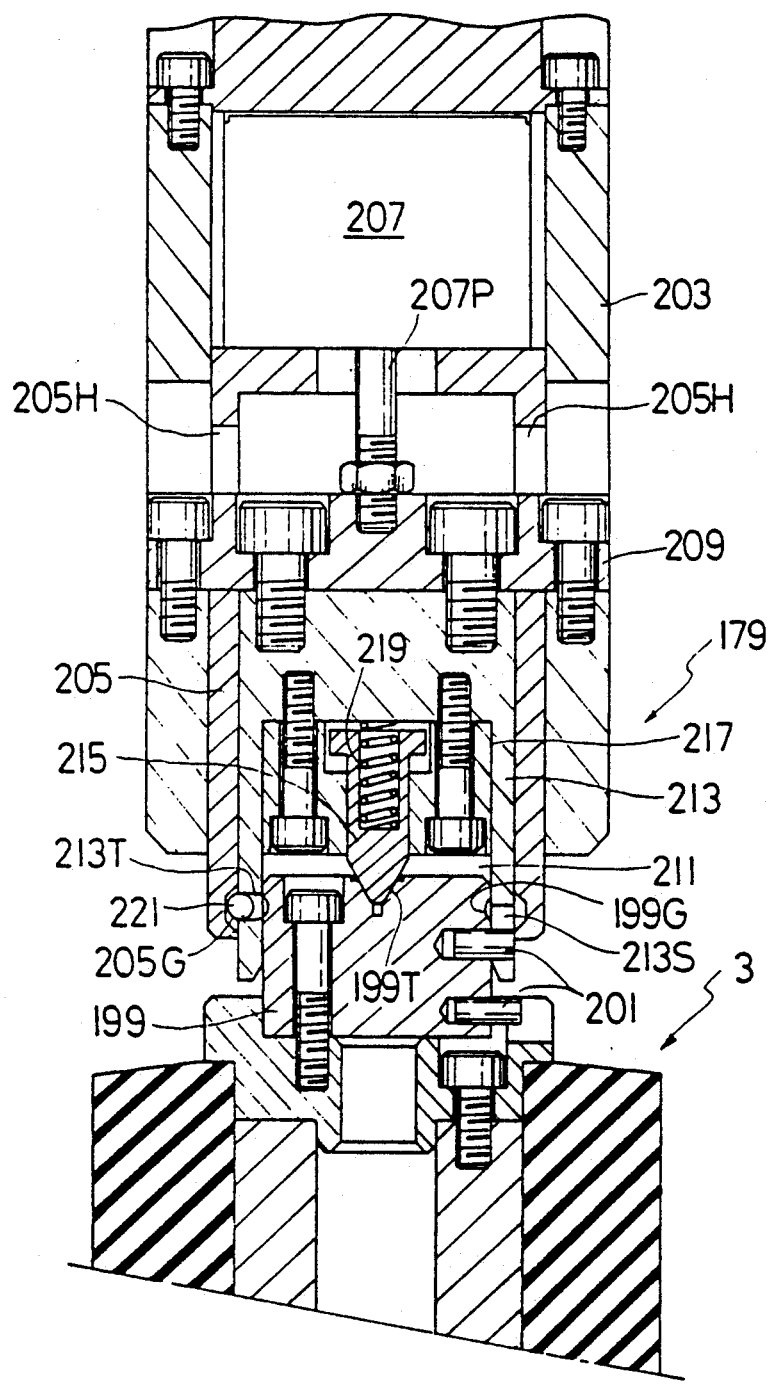
FIG. 24 is an expanded sectional view taken along the line XXIV—XXIV in FIG. 23.

Referring now to FIG. 24, a round column-shaped head block 199 is integrally mounted on the head of the punch 3 so that the head of the punch 3 can be clamped by the punch clamp 179. Horizontal pin keys 201 are provided on the peripheral surface of the punch block 199. A peripheral groove 199G is formed in the upper peripheral surface of the head block 199. In addition, a tapered hole 199T is formed in the center of the upper surface of the head block 199.

The punch clamp 179 for clamping the head block 199 of the punch 3 has a construction as described below. As shown in FIG. 24, the punch clamp 179 include an outer tube member 203 fixed to the lower end of the alining member 185. A tubular clamp sleeve 205 is incorporated for vertical movement in the outer tube member 203. A cylinder 207 such as, for example, an air cylinder, is integrally mounted on the upper section of the tubular clamp sleeve 205 to move the clamp sleeve 205 vertically. A piston rod 207P of the clamping cylinder 207 is connected to a fixed beam member 209; the fixed member is adapted to horizontally penetrate a vertical elongated hole 205H formed in the clamp sleeve 205, and both ends of the fixed member 209 are secured to the outer tubular member 203. Accordingly, the clamp sleeve 205 is moved upwardly and downwardly relative to the outer tube member 203 by actuation of the clamping cylinder 207.

A tubular ball holder 213 with a downward-opening section 211 is inserted in the clamp sleeve 205, and is secured to the fixed beam member 209 by a bolt or the like. The head block 199 of the punch 3 is so dimensioned as to be inserted in the open section 211 of the ball holder 213 from the bottom. In order to align the center axis of the punch 3 with that of the punch clump 179, a tapered pin 215 adapted to engage with the tapered hole 199T is provided in the open section 211 of the ball holder 213. Specifically, the tapered pin 215 is supported for vertical movement in a holder block 217 mounted in the open section 211, and is urged downwardly by a coil spring 219.

In order to clamp the head block 199 of the punch 3, a plurality of tapered holes 213T is formed adjacent to the lower end of the ball holder 213, and a plurality of lock balls 221 adapted to engage with the peripheral groove 199G are housed in the holes 213T. In addition, an inner peripheral groove 205G is formed in the inner peripheral surface of the clump sleeve 205 corresponding to the lock balls 221 to engage with and disengage from the lock balls 221.

A slot 213S is formed at the lower end of the ball holder 213 to be engaged with the pin keys 201, whereby the punch 3 is prevented from rotation relative to the punch clump 179.

Operation of the punch mounting/dismounting device 179 will be described. The sliding member 171 of the punch mounting/dismounting device 163 is first moved laterally along the guide 173. After the punch clamp 179 is located above the punch 3 to be changed and supported on the upper turret disk 13U, or above the punch 3 to be changed and supported on the carriage device 165, the punch lifter 183 descends so that the head block 199 of the punch 3 is inserted into the open section 211 of the ball holder 213, as shown in FIG. 24.

With the head block 199 of the punch 3 being inserted in the open section 211 of the ball holder 213, when the clamping cylinder 207 is activated and the clamp sleeve 205 is moved downwardly, the lock balls 221 engage with the peripheral groove 199G in the head block 199 to clamp the head block 199. Accordingly, the punch 3 can be elevated by elevating the punch lifter 183 with the lock balls 221 engaged in the peripheral groove 199G. In this manner, the punch 3 can be removed from the upper turret disk 13U or from the carriage device 165.

Conversely, the punch 3 can be installed on the upper turret disk 13U or on the carriage device 165 by lowering the punch lifter 183 holding a punch 3 from an elevated position. The punch 3 can be released from the punch clamp 179 by activating the clamping cylinder 207 and returning the clamp sleeve 205 to its original state, as shown in FIG. 24. Specifically, it should be noted that in the state illustrated in FIG. 24, the head block 199 of the punch 3 can be withdrawn from the punch clamp 179.

Referring again to FIG. 22 and FIG. 23, the carriage device 165 is slidably supported on the guide rail 223 which is laid at the side of the turret punch press 1. The carriage device 165 is moved along the guide rail 223 by rotation of the ball screw 225, which is in turn rotated by a servo motor (omitted from the drawings).

Specifically, the carriage device 165 includes a sliding base 227 which is slidably supported on a guide rail 223. A lower fixed shaft 229 (FIG. 23) is integrally erected on the sliding base 227 and a circular plate-shaped lower rotatable disk 231L is rotatably supported on the lower fixed shaft 229. On the other hand, a circular lower fixed plate 233 is integrally mounted on the lower fixed shaft 229. The lower rotatable disk 231L is thus rotatable relative to the lower fixed plate 233. An upper fixed plate 237 is provided on a plurality of supporting columns 235 erected on the upper surface of the lower fixed plate 233. An upper fixed shaft 239 which is concentric with the lower fixed shaft 229 is erected on the upper surface of the upper fixed plate 237. An upper rotatable disk 231U is rotatably supported on the upper fixed shaft 239 in opposition to the lower rotatable disk 231L.

An upper sprocket 241U is integrally mounted on the upper rotatable disk 231U to rotate the upper rotatable disk 231U, and a lower sprocket 241L is integrally mounted on the lower rotatable disk 231L to rotate the lower rotatable disk 231L. An upper chain 247 (FIG. 22) is fitted around the upper sprocket 241U and an upper sprocket 245 mounted on the base 227, and a lower chain is fitted around the lower sprocket 241L and a lower sprocket mounted on the base 227 (the lower chain and the lower sprocket mounted on the base 227 are located behind the upper chain 247 and the upper sprocket 245 respectively in FIG. 22, and are omitted from the drawing); the upper and lower sprockets are rotated simultaneously by means of a servomotor 243. Hence, the upper and lower rotatable disks 231U, 231L are rotated simultaneously in the same direction by means of a servo motor 243 mounted on the base 227.

To position the upper and lower rotatable disks 231U, 231L in a suitable angular positions, upper and lower positioning bushings 249U, 249L are provided at a plurality positions on the upper and lower rotatable disks 231U, 231L respectively. In addition, a bracket 251 extending in the radial direction of the upper rotary disk 231U is mounted on the upper part of the upper fixed shaft 239, and an upper positioning pin 253U adapted to engage with the upper bushing 249U is provided for vertical movement on the free end of the bracket 251. Similarly, a lower positioning pin 253L adapted to engage with the lower bushing 249L is provided for vertical movement on the sliding base 227. Cylinders 255U, 255L are provided to effect the vertical movements of the upper and lower positioning pin 253U, 253L respectively.

Accordingly, the upper and lower rotatable disks 231U, 231L is selectively located in an angular position by activating the upper and lower cylinders 255U, 255L, thus engaging and disengaging the upper and lower positioning pins 253U, 253L in the positioning bushings 249U, 249L respectively.

As shown in FIG. 23, the punches 3 are removably mounted on the upper rotatable disk 231U in a number of punches 3 are removably installed in punch mounting holes formed in the upper rotatable disk 231U, and a punches 3 on the upper rotatable disk 231U is changed for a punch 3 on the upper turret disk 13U by means of the punch mounting/dismounting device 163.

Figure 25:
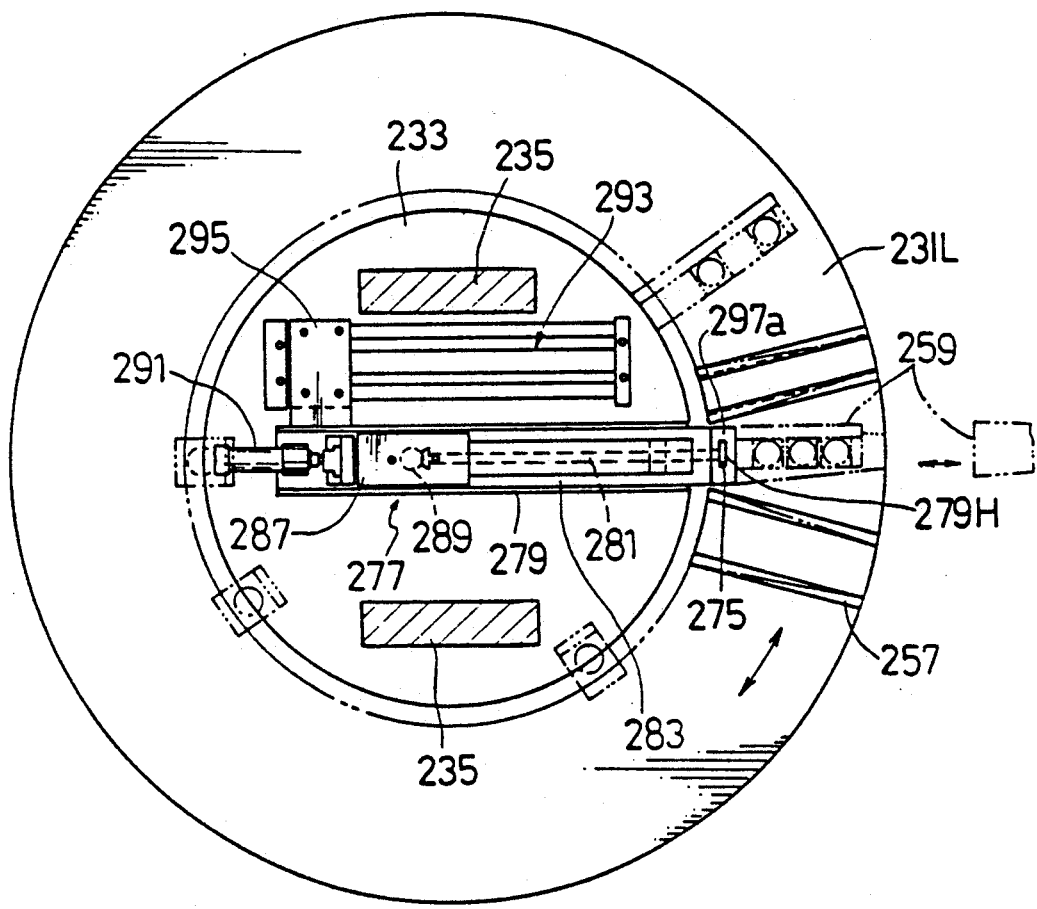
FIG. 25 is an explanatory plan view taken along the line XXV—XXV in FIG. 23.

Referring now to FIG. 25 as well as FIG. 22, a plurality of die bases 257 is provided in a plurality of angular positions adjacent to the outer periphery of the lower rotatable disk 231L. Each of the die bases 257 is adapted to removably support a die holder 259 for holding a suitable number of dies 5. Similarly, a plurality of die supports 265 (FIG. 23) are provided in a plurality of angular positions adjacent to the outer periphery of the lower turret disk 13L to support the die holder 259 removably.

Figure 26A:
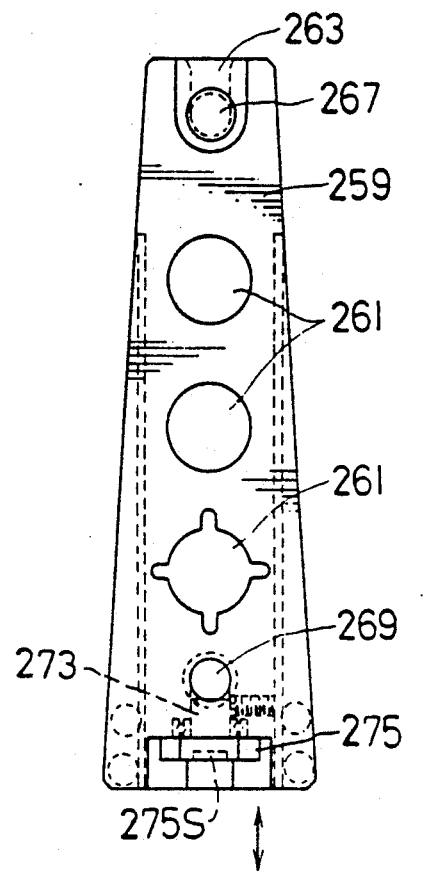
FIGS. 26A, 26B, and 26C are a plan view, end elevation, and partial side elevation of the die holder of the second embodiment.
Figure 26B:
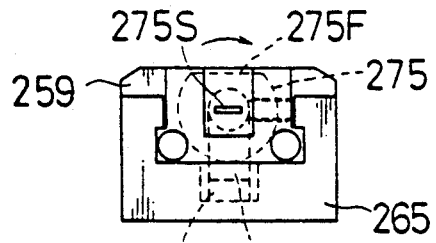
Figure 26C:
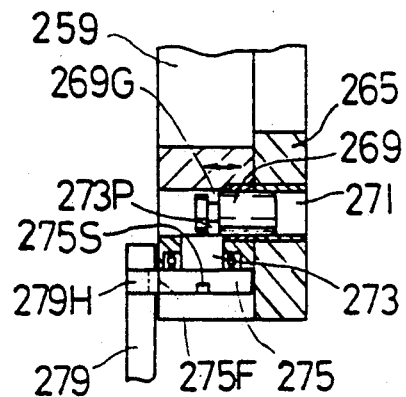

Referring now to FIGS. 26A, 26B, 26C, a suitable number of die mounting holes 261 is formed in the die holder 259, each in a suitable position in the die holder 259 for holding a die 5, and a U-shaped notch section 263 is formed at the end of the die holder 259. This notch section 263 is adapted to engage with a positioning pin 267 provided at the end of the die support 265 mounted on the lower turret disk 13L. The notch section 263 precisely position the die holder 259 with respect to the die support 265 by engaging the positioning pin 267.

A vertically movable securing pin 269 is provided in the die holder 259 to lock the die holder 259 in the die support 265. An engaging hole 271 in which the securing pin 269 is inserted and engaged is provided in the die support 265. A rotary shaft 273 is provided on the die holder 259 to move the securing pin 269 vertically. Specifically, a projection 273P adapted to engage with a peripheral groove 269G formed in the securing pin 269 is provided in an eccentric position on the surface of one end of the rotary shaft 273. A circular flange 275 is provided on the other end of the rotary shaft 273, formed with a notch section 275F at its periphery and with a slotted groove 275S on one end surface thereof.

As a result of this configuration, when the flange 275 is rotated so that the notch section 275F reaches the bottom side, the securing pin 269 is raised by the eccentric projection 273P, and is withdrawn from the engaging hole 271 in the die support 265. Accordingly, the die holder 259 can be removed from the die support 265. Conversely, when the flange 275 is rotated so that the notch section 275F is in a upper position, the securing pin 269 is engaged in the engaging hole 271 of the die support 265, and the die holder 259 is locked in the die support 265.

The configuration of the die base 257 for maintaining the die holder 259 on the lower rotatable disk 231L is almost identical to the configuration of the die support 265 with the positioning pin 267 removed, therefore a more detailed description of the configuration of the die base 257 is omitted.

Referring again to FIGS. 23 and 25, a die holder transfer device 277 is mounted on the lower fixed plate 233 of the carriage device 165 to move the die holder 259 back and forth between the lower turret disk 13L and the lower rotatable disk 231L.

Specifically, a push/pull slide 279 is provided at the center of the upper surface of the lower fixed plate 233 for movement in the radial direction of the lower rotatable disk 231L. The free end of the push/pull slide 279 is adapted to couple with the die holder 259. Specifically, a plate member 279a (FIG. 25) is provided on the free end of the push/pull slide 279 at a height corresponding to the upper surface of the die holder 259, so that when the push/pull slide 279 is moved toward the turret disk 13L, the plate member 279a can be moved onto the upper surface of the die holder 259, which may be mounted on the lower rotatable disk 231L or on the lower turret disk 13L; in addition, an elongated hole 279H (FIG. 25) adapted to engage the flange 275 is formed in the plate members 279a.

A shaft holder 283 is supported on the push/pull slide 279 for sliding in the longitudinal direction of the slide 279, and a rotary shaft 281 is rotatably supported on the shaft holder 283 with the distal end of the rotary shaft 281 adapted to engage with a slotted groove 275S in the flange 275. More specifically, the shaft holder 283 is slidably supported on the upper part of the push/pull slide 279 having a C-shaped form in cross section, and the rotary shaft 281 is rotatably supported on the shaft holder 283 through a bearing 283B fixed thereto. A bevel gear 289 provided on the output shaft of a rotary actuator 287 mounted on the shaft holder 283 engages with a bevel gear 285 provided on the proximal end of the rotary shaft 281.

In order to slide the shaft holder 283 back and forth relative to the push/pull slide 279, a cylinder 291 is mounted on the push/pull slide 279 and a piston rod 291P of the cylinder 291 is connected to the shaft holder 283. In addition, to move the push/pull slide 279 back and forth in the radial direction of the lower rotatable disk 231L, a linear actuator 293 (FIG. 25) such as, for example, a rodless cylinder is mounted on the lower fixed plate 233, and a moving element 295 of the actuator 293 is connected to the push/pull slide 279. A rodless cylinder as a linear actuator 293 is commonly known, therefore an explanation of the structure and operation of a rodless cylinder will be omitted.

The operation of the second embodiment of the tool changing apparatus will now be explained. In the case where the die holder 259 is moved from the lower rotatable disk 231L onto the lower turret disk 13L, when the plate member 279a of the push/pull slide 279 is on the upper surface of the die holder 259 mounted on the lower rotatable disk 231L, the cylinder 291 is activated to move the shaft holder 283 toward the die holder 295 so that the free end of the rotary shaft 281 engages with the slot 275S in the flange 275 of the die holder 259.

Then, the rotary actuator 287 is actuated to rotate the rotatable shaft 281. As a result of the rotation of the rotary shaft 281, the notch section 275F of the flange 275 reaches the lower side, so that the pin 269 is withdrawn from the engaging hole 271 and the die holder 259 is released from the die base 257. In addition, one part of the periphery of the flange 275 is inserted in the elongated hole 279H of the plate member 279a, so that the push/pull slide 279 and the die holder 259 are coupled with each other.

The linear actuator 293 is then actuated to move the push/pull slide 279 toward the lower turret disk 13L. Following the movement of the die holder 259 onto the die support 265 on the lower turret disk 13L, the rotary actuator 287 is actuated so that the flange 275 is rotated and the notch section 275F reaches the upper side. The die holder 259 is then locked in the die support 265, and the coupling of the die holder 259 and the push/pull slide 279 is released to enable the push/pull slide 279 to return to the original position.

Therefore, in this embodiment, changing of the die holder 259 mounted on the lower turret disk 13L can be easily accomplished by means of the die holder transfer device 277.

In order to change the die 5 on the die holder 259 which has been moved onto the lower rotatable disk 231L, a plurality of upper cylinders 301 (FIG. 23) is provided on a bracket 297 secured on the upper fixed plate 237. Each upper cylinders 301 is provided with a vertically movable upper plunger 299 adapted to push the die 5 downwardly to remove the die 5 from the die holder 259. In addition, a die supporting block 303 for temporarily supporting the die 5 is provided on an upper surface section of the base 227 in opposition to the bracket 297; specifically, the die supporting block 303 is formed with a die maintaining hole 303H for temporarily maintaining the die 5. A plurality of lower cylinders 305 with vertically movable lower plungers 307 adapted to push the die 5 up from below is provided on the base 227 in opposition to the upper cylinders 301.

In operation, when the die holder 259 is positioned on the die holding block 303, the upper and lower cylinders 301, 305 are activated and the die 5 is removed from the die holder 259 by insertion of the die 5 into the die maintaining hole 303H of the die holding block 303 while it is interposedly held between the upper and the lower plungers 299, 307. Following this, the lower rotatable disk 231L is suitably rotated and an empty die holder 259 supported on the rotatable disk 231L is positioned on the die holding block 303, after which the die 5 which has been removed from a previous die holder and held in the die maintaining block 303 is inserted into a die mounting hole of the empty die holder 259. In this manner, the die 5 in the die holder 259 can be changed. Specifically, it is possible to change combination of the dies 5 held in the plurality of the die mounting holes of the die holder 259.

What is claimed is:

1. A die storage apparatus for storing a die which is removed from a die holder adapted to removably support a plurality of dies, the apparatus comprising:
   a main body including a hole for storing a die;
   first and second plungers each supported on the main body in such a way as to face each other and be movable along an axis that is coincident with an axis of the hole, the shapes of the cross sections of the first and second plungers corresponding to that of the cross section of the die to be stored;
   means for positioning a die holder with respect to the main body so that a die supported on the die holder and to be stored in the die storage apparatus is located between the plungers.

2. The die storage apparatus of claim 1, further including means for moving the first and second plungers.

3. The die storage apparatus of claim 2, wherein the means for moving the first and second plungers includes first and second hydraulic cylinders each adapted to couple with the first and second plungers.

* * * * *